United States Patent
Hasegawa

(10) Patent No.: US 11,941,309 B2
(45) Date of Patent: Mar. 26, 2024

(54) INFORMATION PROCESSING SYSTEM, PRINTING CONTROL METHOD, AND MEDIUM FOR SUPPORTING TRUST PRINTING

(71) Applicant: CANON KABUSHIKI KAISHA, Tokyo (JP)

(72) Inventor: Kiwamu Hasegawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/306,373

(22) Filed: Apr. 25, 2023

(65) Prior Publication Data

US 2023/0350616 A1  Nov. 2, 2023

(30) Foreign Application Priority Data

Apr. 28, 2022 (JP) ................... 2022-075366

(51) Int. Cl.
*G06F 3/12* (2006.01)

(52) U.S. Cl.
CPC .......... *G06F 3/1222* (2013.01); *G06F 3/1238* (2013.01); *G06F 3/1253* (2013.01); *G06F 3/126* (2013.01)

(58) Field of Classification Search
None
See application file for complete search history.

(56) References Cited

U.S. PATENT DOCUMENTS

| | | | |
|---|---|---|---|
| 11,449,621 B2 | 9/2022 | Sato et al. | |
| 2015/0029549 A1* | 1/2015 | Murata | G06K 15/1809 358/1.15 |
| 2019/0303051 A1* | 10/2019 | Hwang | G06F 3/1238 |
| 2020/0341698 A1* | 10/2020 | Masuda | G06F 3/1288 |
| 2020/0341702 A1* | 10/2020 | Kosaka | G06F 21/608 |
| 2021/0019432 A1* | 1/2021 | Sato | H04N 1/444 |
| 2021/0243329 A1* | 8/2021 | Sohma | H04N 1/32101 |
| 2022/0131983 A1* | 4/2022 | Hasegawa | H04N 1/32144 |
| 2022/0141353 A1* | 5/2022 | Kamekawa | G06F 3/1285 358/1.14 |
| 2022/0214843 A1* | 7/2022 | Kikuchi | G06F 3/1267 |

FOREIGN PATENT DOCUMENTS

JP  2021019271 A  2/2021

* cited by examiner

*Primary Examiner* — Henok Shiferaw
(74) *Attorney, Agent, or Firm* — ROSSI, KIMMS & McDOWELL LLP

(57) ABSTRACT

An information processing system is provided for supporting trust printing that prints a document to be printed by registering the document in a document assurance system that assures authenticity of the document. The system obtains information of usable image formation apparatuses, and provides a setting screen of an image formation apparatus selected from the usable image formation apparatuses based on the information, and causes the selected image formation apparatus to print the document to be printed in accordance with setting on the setting screen. The information contains information indicating whether the selected image formation apparatus is capable of the trust printing, and, in the providing, if the selected image formation apparatus is incapable of the trust printing, the setting screen is displayed such that a setting item for the trust printing cannot be selected.

9 Claims, 17 Drawing Sheets

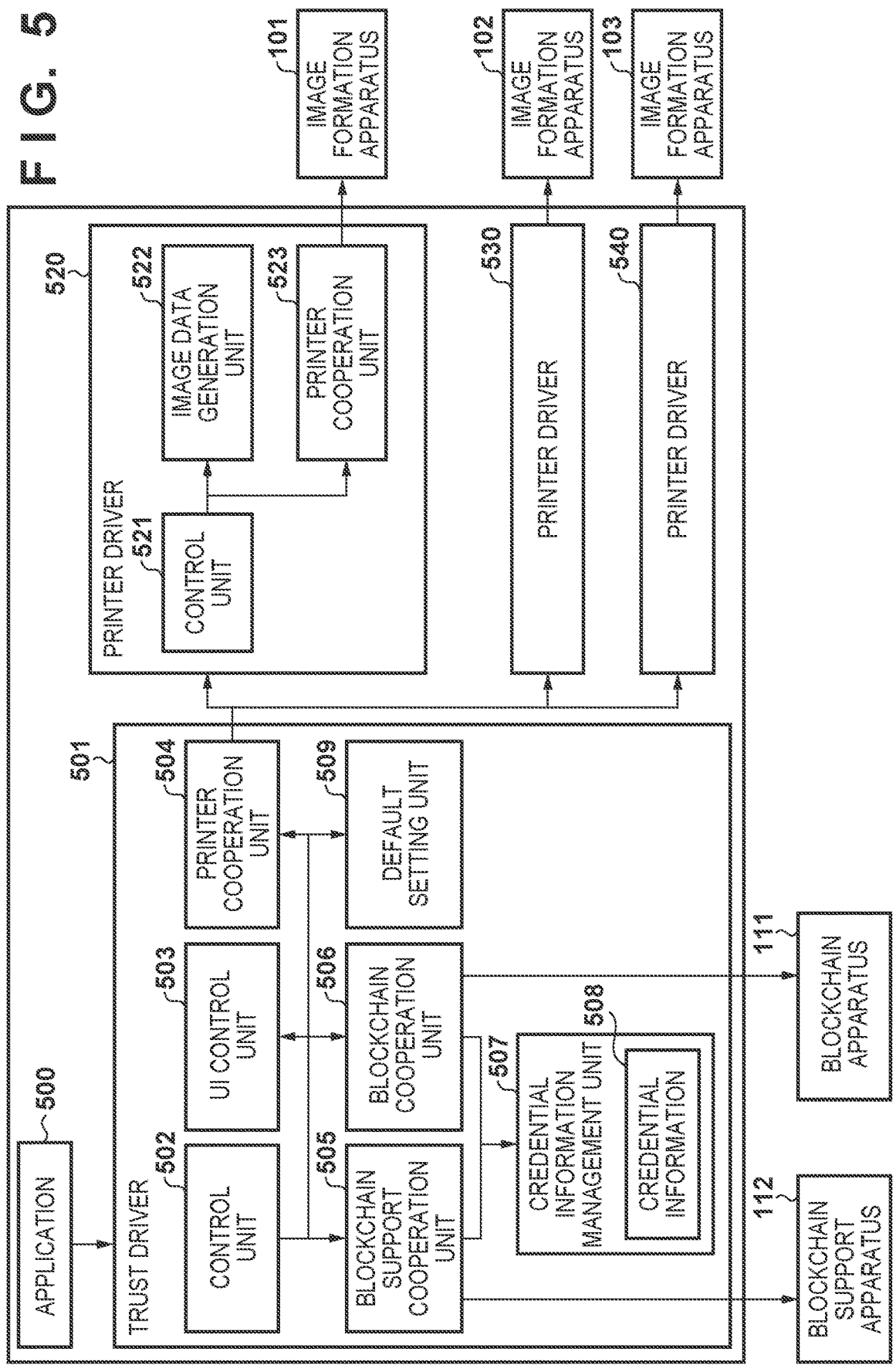

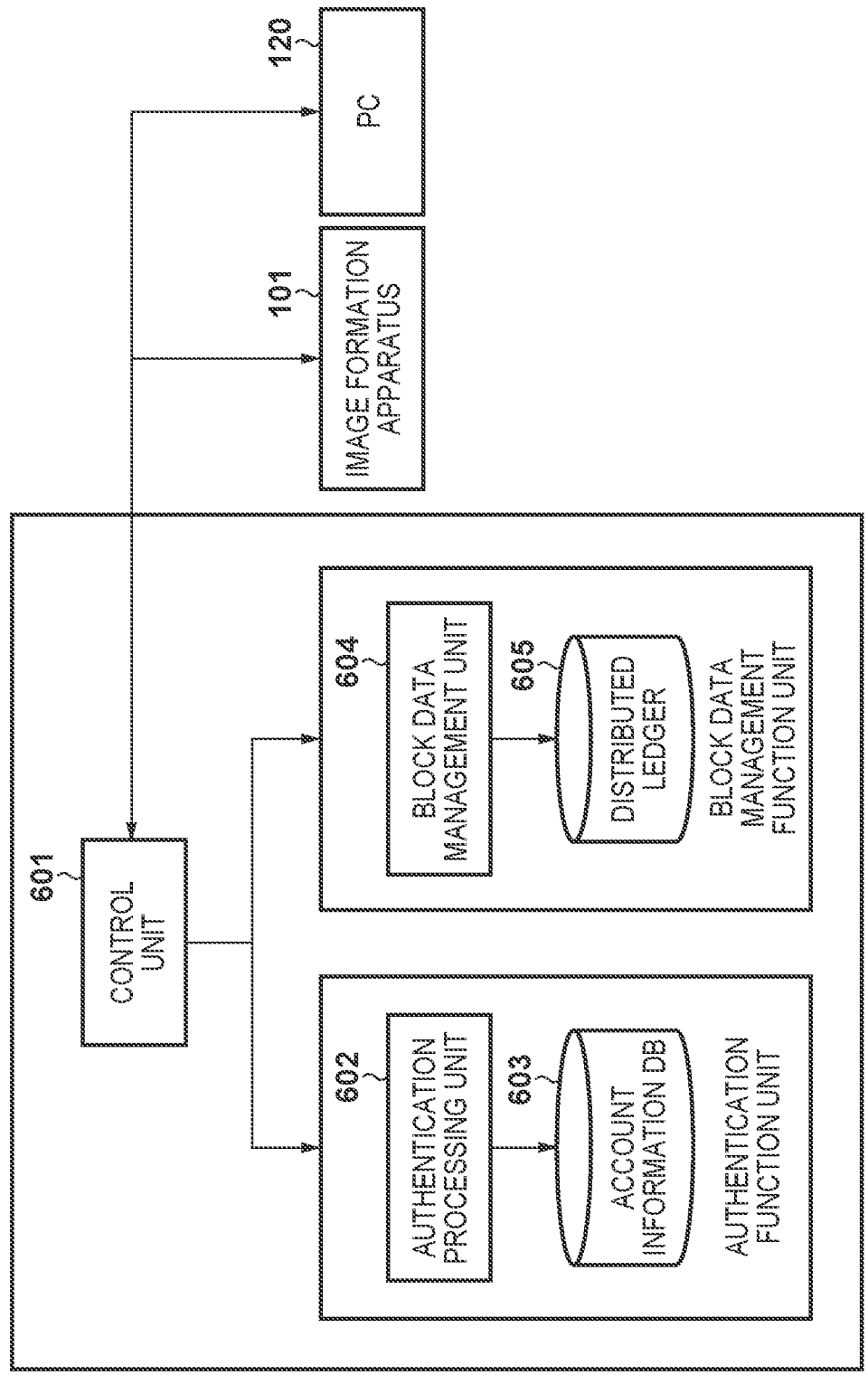

FIG. 8A

```
┌─800
│ ┌PRINTING SETTINGS──────────────────┐
│ │ PRINTER FOR PRINTING              │
│ │ ┌IMAGE FORMATION ▼┐ ┌PRINTER    ┐ │
│ │ │APPARATUS 101    │ │PROPERTY   │ │
│ │ └─────────────────┘ └───────────┘ │
│ │  TRUST PRINTING                   │
│ │    ◉ YES    ○ NO                  │
│ │  PAGE-BY-PAGE                     │
│ │  REGISTRATION  ○ ON  ◉ OFF        │
│ │  TO BC                            │
│ │  CODE SYSTEM                      │
│ │    ○ QR   ◉ DOT PATTERN           │
│ │    ○ YELLOW DOT PATTERN           │
│ │  PRINT FINISHING                  │
│ │    SHEET SIZE   [A4 ▼]            │
│ │    NUMBER OF    [1 ▲▼]            │
│ │    COPIES                         │
│ │    DIRECTION  ◉ VERTICAL ○ HORIZONTAL │
│ │    OF PRINTING                    │
│ │                    [START PRINTING]│
│ └───────────────────────────────────┘
```

- 801: IMAGE FORMATION APPARATUS 101
- 802: PRINTER PROPERTY
- 803: TRUST PRINTING options
- 804: PRINT FINISHING options
- 805: START PRINTING

FIG. 8B

```
┌PRINTING SETTINGS──────────────────┐
│ PRINTER FOR PRINTING              │
│ ┌IMAGE FORMATION ▼┐ ┌PRINTER    ┐ │
│ │APPARATUS 101    │ │PROPERTY   │ │
│ └─────────────────┘ └───────────┘ │
│   ┌IMAGE FORMATION─┐              │
│   │APPARATUS 101   │              │
│   ├────────────────┤              │
│   │IMAGE FORMATION │  NO          │
│   │APPARATUS 102   │              │
│   ├────────────────┤              │
│   │IMAGE FORMATION │              │
│   │APPARATUS 103   │              │
│   └────────────────┘              │
│   BC REGISTRATION  ○ ON  ◉ OFF    │
└───────────────────────────────────┘
```

- 810: dropdown list

FIG. 8C

```
┌DEVICE INFORMATION─────────────────┐
│ MODEL : IMAGE FORMATION           │
│ APPARATUS 101                     │
│ MANUFACTURER : COMPANY A          │
│ VERSION : V1.00                   │
│ SERIAL NUMBER : 42312525          │
│ IP ADDRESS : 192.168.0.50         │
└───────────────────────────────────┘
```

DEFAULT SETTING
PRINTER FOR PRINTING
[IMAGE FORMATION APPARATUS 101 ▼] [PRINTER PROPERTY]

TRUST PRINTING
⦿ YES   ○ NO
PAGE-BY-PAGE
REGISTRATION  ○ ON  ⦿ OFF
TO BC
CODE SYSTEM
○ QR   ⦿ DOT PATTERN
○ YELLOW DOT PATTERN
PRINT FINISHING
SHEET SIZE  [A4 ▼]
NUMBER OF COPIES  [1 ⬍]
DIRECTION  ⦿ VERTICAL  ○ HORIZONTAL
OF PRINTING

[SETTING] — 831

PRINTING SETTINGS
PRINTER FOR PRINTING (DEFAULT PRINTER)
841 — [IMAGE FORMATION APPARATUS 101 ▼] [PRINTER PROPERTY]
[PRINTER SELECTION] — 842

TRUST PRINTING
⦿ YES   ○ NO
PAGE-BY-PAGE
REGISTRATION  ○ ON  ⦿ OFF
TO BC
CODE SYSTEM
○ QR   ⦿ DOT PATTERN
○ YELLOW DOT PATTERN
PRINT FINISHING
SHEET SIZE  [A4 ▼]
NUMBER OF COPIES  [1 ⬍]
DIRECTION  ⦿ VERTICAL  ○ HORIZONTAL
OF PRINTING

[START PRINTING]

FIG. 8G

PRINTER INFORMATION DB MANAGEMENT — 860

| | MODEL NAME | VERSION | MANUFACTURER | DB UPDATE DATE | CODE SYSTEM | PERFORMANCE |
|---|---|---|---|---|---|---|
| ☑ | IMAGE FORMATION APPARATUS 101 | AFTER V1.00 | COMPANY A | 2021 12/14 | QR DOT PATTERN | 300dpi MONOCHROME PRINTING |
| ☐ | ... | | | | | |
| ☐ | ... | | | | | |
| ☐ | | | | | | |

— 861

[ADD PRINTER] — 862
[UPDATE SELECTED PRINTER] — 863
[DELETE SELECTED PRINTER] — 864

FIG. 8H

INFORMATION OF PRINTER TO BE ADDED — 870

MODEL NAME: ▭
VERSION: ▭
MANUFACTURER: ▭
CODE SYSTEM: ▭
PERFORMANCE: ▭

— 871

[ADD PRINTER] — 872

FIG. 8I

INFORMATION OF PRINTER TO BE ADDED — 880

MODEL NAME: IMAGE FORMATION APPARATUS 101
VERSION: AFTER V1.00
MANUFACTURER: COMPANY A
CODE SYSTEM: QR, DOT PATTERN
PERFORMANCE: 300dpi, MONOCHROME PRINTING

— 881

[UPDATE INFORMATION] — 882

F I G. 9E
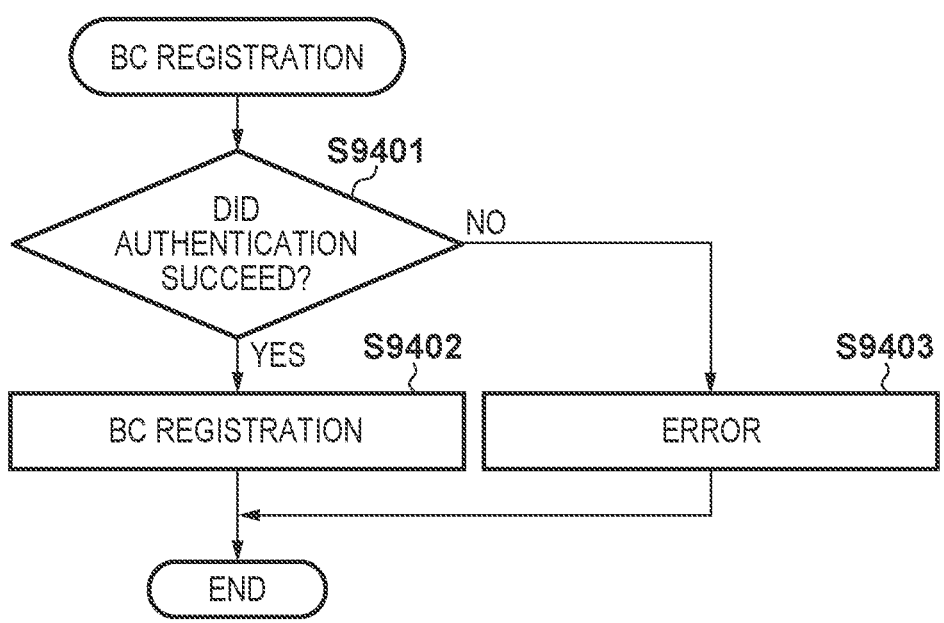

INFORMATION PROCESSING SYSTEM, PRINTING CONTROL METHOD, AND MEDIUM FOR SUPPORTING TRUST PRINTING

BACKGROUND OF THE INVENTION

Field of the Invention

The present invention relates to an information processing system, a printing control method, and a medium for preventing electronic data record falsification by using a blockchain.

Description of the Related Art

It is known that when information of a paper document printed by an image formation apparatus is registered in a blockchain, the reliability is secured in recorded information indicating that the document is printed based on specific electronic data (see Japanese Patent Laid-Open No. 2021-19271). Note that a system for registering information of a paper document in a blockchain as described above will be called a blockchain cooperation printing system hereinafter.

Information to be registered on a blockchain includes a document identification information for identifying a document, the registration date/time, registrant information (a registration user, a registration device, and a registration system), and original document identification information that indicates an original document from which the document of interest is changed or an original document from which the document of interest is printed. As the document identification information and the original document identification information, a hash value capable of uniquely specifying a document is used. An image formation apparatus encodes this document identification information, embeds the code in image data of a paper document, and prints out the paper document having the embed code, thereby associating the paper document with the document identification information. A system for verifying a document (to be referred to as a verification system hereinafter) can verify the authenticity of the document by checking whether the document identification information obtained by decoding the code read from the paper document is registered on a blockchain. Note that verification like this will be called scan verification hereinafter.

Some existing image formation apparatuses widely spread in the market do not have a function of printing document identification information on a paper document, and a function of performing registration to a blockchain. Configurations like these cannot use a blockchain.

To solve this problem, it is possible to use a configuration in which, instead of the image formation apparatus, a system (for example, a cloud service or PC application) outside the image formation apparatus has a function of embedding document identification information in image data to be transmitted to the image formation apparatus, and a function of performing registration to a blockchain.

Unfortunately, a configuration like this has the problem that the image formation apparatus for performing printing cannot be controlled. For example, a user can instruct any image formation apparatus to print out a document registered on a blockchain (also called a blockchain cooperation document hereinafter), so he or she may instruct an image formation apparatus that does not sufficiently satisfy the printing quality to print out the document. That is, a document (or coded document identification information) having quality with which the verification system cannot perform scan verification is printed out in some cases. The result is the problem that even when the user printed out a document registered on a blockchain, the verification result of the authenticity of the document determines that the document is not authentic. Also, even when there is a case in which, for the convenience of business, for example, it is desirable to limit an image formation apparatus capable of printing out a document registered on a blockchain, a case like this cannot be controlled.

SUMMARY OF THE INVENTION

The present invention prints out a blockchain cooperation document by using an image formation apparatus not corresponding to a blockchain cooperation printing system, and controls the use of the apparatus.

The present invention has the following configuration. That is, according to one aspect of the present invention, there is provided an information processing system for supporting trust printing that prints a document to be printed by registering the document in a document assurance system that assures authenticity of the document, comprising: at least one memory storing at least one program; and at least one processor, wherein the at least one program causes the at least one processor to: obtain information of usable image formation apparatuses, and provide a setting screen of an image formation apparatus selected from the usable image formation apparatuses based on the information, and cause the selected image formation apparatus to print the document to be printed in accordance with setting on the setting screen, and wherein the information contains information indicating whether the selected image formation apparatus is capable of the trust printing, and, in the providing, if the selected image formation apparatus is incapable of the trust printing, the setting screen is displayed such that a setting item for the trust printing cannot be selected.

According to the present invention, it is possible to print out a blockchain cooperation document by using an image formation apparatus not corresponding to a blockchain cooperation printing system, and control the use of the apparatus.

Further features of the present invention will become apparent from the following description of exemplary embodiments with reference to the attached drawings.

BRIEF DESCRIPTION OF THE DRAWINGS

FIG. 5 is a view showing the software configuration of the PC;

FIG. 6A is a view showing the software configuration of a blockchain apparatus;

FIGS. 8A to 8F are views showing examples of a printing setting screen;

FIGS. 8G to 8I are views showing examples of a printer information database management screen;

FIG. 9E is a flowchart of blockchain registration; and

DESCRIPTION OF THE EMBODIMENTS

Figure 1:
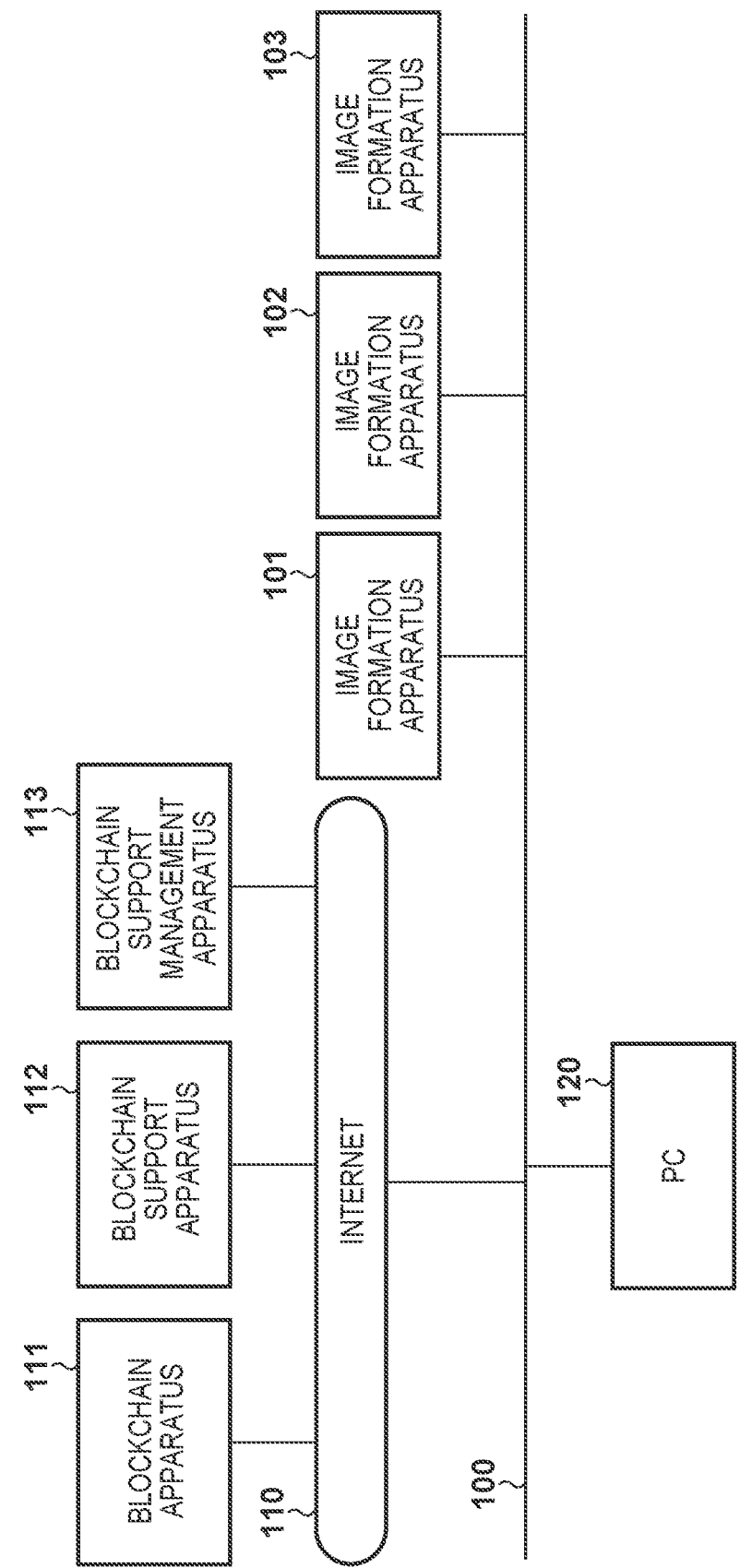
FIG. 1 is a view showing a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

System Configuration

FIG. 1 is an overall view of a system related to a blockchain service in this embodiment. Image formation apparatuses 101, 102, and 103 and a PC 120 exist in an intranet connected to a LAN 100, and communicate with a blockchain apparatus 111 and a blockchain support apparatus 112 across Internet 110. Note that this configuration includes the Internet 110, but the configuration can also be completed within the same intranet. This system registers a document to be printed on a blockchain, thereby making falsification of the registered contents difficult. Also, this system prints out a hash value registered on a blockchain as an imaged code together with a document to be printed, thereby enabling scan verification of the code. Accordingly, this system can also be called an image formation system, a document verification system, a document assurance system, or an information processing system.

The image formation apparatuses 101 to 103 are apparatuses for printing a document in accordance with instructions from the PC 120. Differences between these image formation apparatuses are as follows. The image formation apparatus 101 does not directly cooperate with the blockchain apparatus 111, but has performance of printing a document registered in a blockchain. The image formation apparatus 102 directly cooperates with the blockchain apparatus 111. The image formation apparatus 103 does not directly cooperate with the blockchain apparatus, and does not have performance of printing a document registered in a blockchain. The performance of printing a document registered in a blockchain includes, for example, performance capable of printing an image with a resolution equal to or higher than a predetermined resolution. Information indicating whether the image formation apparatus can directly cooperate with the blockchain apparatus 111 can be contained in information such as printer information held by the image formation apparatus, and can also be held by a printer driver.

The blockchain apparatus 111 is an apparatus for providing a blockchain service for registering and verifying a transaction by which document information is stored in a blockchain.

The blockchain support apparatus 112 is an apparatus for providing a function of supporting the blockchain service. The blockchain support apparatus 112 has a printer information managing function for determining whether an image formation apparatus satisfies the performance of printing a document registered in a blockchain. The blockchain support apparatus 112 also has a function of generating document identification information for uniquely identify a document, and a function of synthesizing an image containing coded document identification information on image data corresponding to a document to be printed. The blockchain support apparatus 112 can be implemented by one or a plurality of information processing apparatuses, and can also be called a blockchain support system.

A blockchain support management apparatus 113 is an apparatus that manages the blockchain support apparatus across the Internet 110. Since an example in which a browser application performs management by WEB will be explained, the software configuration can be the same as that of a general PC. The blockchain support management apparatus 113 can also be implemented by one or a plurality of information processing apparatuses. Note that an application will be abbreviated as appl. in some cases hereinafter.

The PC 120 uses the support function provided by the blockchain support apparatus 112, instructs the blockchain apparatus 111 to register a printing document in a blockchain, and instructs the image formation apparatuses 101 to 103 to perform printing.

Figure 2:
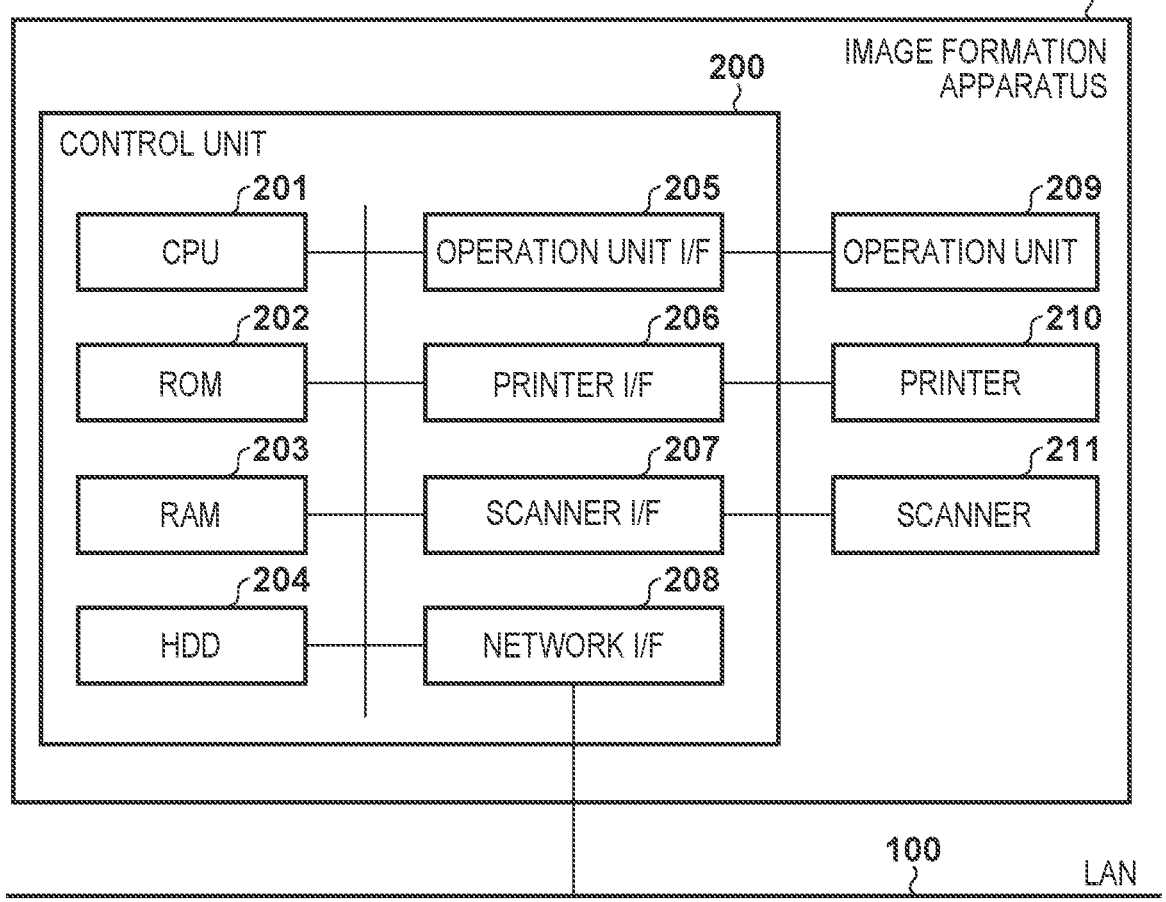
FIG. 2 is a view showing the hardware configuration of an image formation apparatus.

FIG. 2 is a block diagram showing the hardware configuration of the image formation apparatuses 101 to 103 as an example of an information processing apparatus. FIG. 2 shows the configuration of the image formation apparatus 101, but the other image formation apparatuses have the same configuration. A control unit 200 including a Central Processing Unit (CPU) 201 controls the overall operation of the image formation apparatus 101. The CPU 201 reads out a control program stored in a Read Only Memory (ROM) 202 and performs various kinds of control such as read control and transmission control. A Random Access Memory (RAM) 203 is used as a temporary storage area such as a main memory or a work area of the CPU 201. A Hard Disk Drive (HDD) 204 stores image data, various programs, or various kinds of data (to be described later). The image formation apparatus 101 has the hardware configuration of an information processing apparatus, and further has the following hardware configuration in addition to that.

An operation unit OF 205 connects an operation unit 209 and the control unit 200. The operation unit 209 provides a User Interface (UI) of the image formation apparatus 101. A printer I/F 206 connects a printer 210 and the control unit 200. Image data to be printed by the printer 210 is transferred from the control unit 200 via the printer I/F 206, and printed on a print medium in the printer 210. A scanner I/F 207 connects a scanner 211 and the control unit 200. The scanner 211 generates image data by reading an image on an original, and inputs the image data to the control unit 200 via the scanner I/F 207.

A network I/F 208 connects the control unit 200 (the image formation apparatus 101) to the LAN 100. The network I/F 208 transmits image data and information to an external apparatus on the LAN 100, and receives various pieces of information from an external apparatus on the LAN 100.

Figure 3:
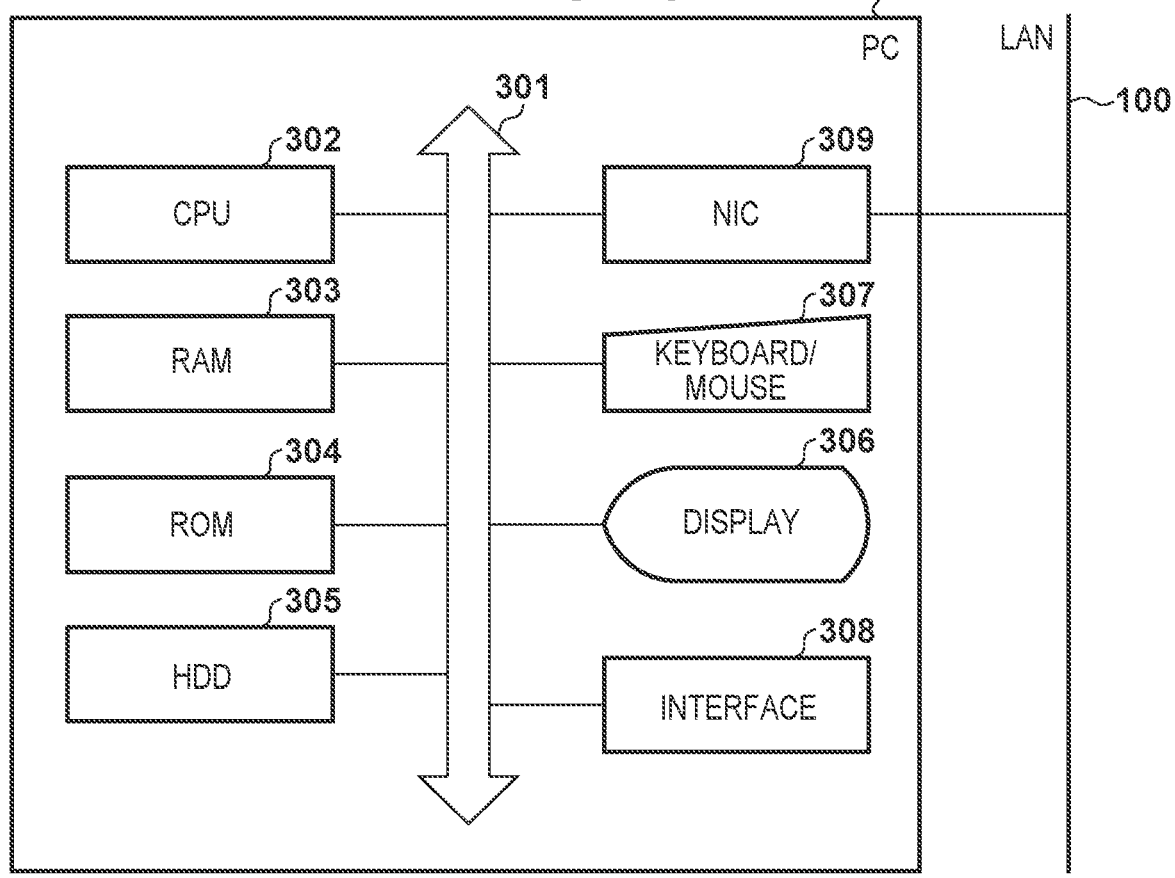
FIG. 3 is a view showing the hardware configuration of a PC.

FIG. 3 is a block diagram showing the hardware configuration of the PC 120 and the blockchain support management apparatus 113 as examples of an information processing apparatus. Note that although not shown in FIG. 3, the blockchain apparatus 111 and the blockchain support apparatus 112 as other examples of an information processing apparatus can have the same hardware configuration as that of the PC 120. A CPU 302 controls the whole apparatus. The CPU 302 performs control for executing an application program and an OS stored in an HDD 305, and temporarily storing information, files, and the like necessary to execute the program in a RAM 303. A ROM 304 is a storage unit and stores various kinds of data such as a basic I/O program. The RAM 303 is a temporary storage unit and functions as a main memory, a work area, and the like of the CPU 302. The HDD 305 is one of external storage units, functions as a large-capacity memory, and stores, for example, application programs such as office applications and a Web browser, an OS, and related programs.

A display 306 is a display means and displays commands and the like input from a keyboard/mouse 307 as an instruction input unit. An interface 308 is an external apparatus I/F and connects a printer, a USB device, and a peripheral device. A system bus 301 lets data flow in the apparatus. A network interface card (to be referred to as an NIC hereinafter) 309 exchanges data with an external apparatus via the LAN 100.

Not that the configuration of the information processing apparatus is merely an example, and is not limited to the configuration examples shown in FIGS. 2 and 3. For example, the storage destination of data or a program can be changed to the ROM 304, the RAM 303, or the HDD 305 in accordance with the feature of the data or the program. In this embodiment, various processes are implemented by loading programs stored in the ROM 304 or the like into the RAM 303 or the like, and executing the loaded programs by the CPU 302, unless otherwise specified. In addition, the display 306 and the keyboard/mouse 307 provide the UI in FIG. 3, but the UI can also be provided by a touch panel or the like.

Software Configuration of Image Formation Apparatus

Figure 4A:
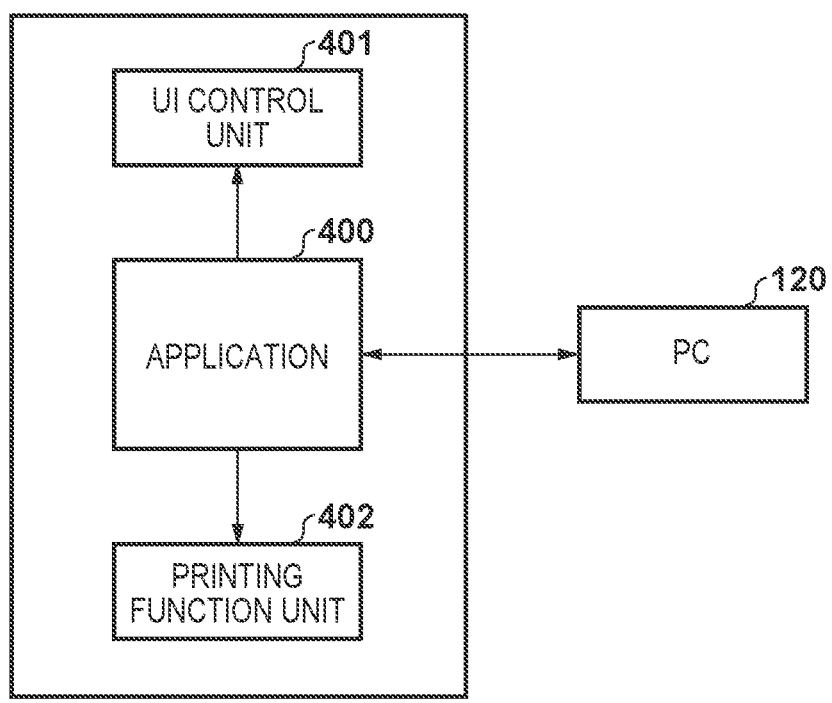
FIG. 4A is a view showing the software configuration of the image formation apparatus.

FIG. 4A is a block diagram showing a software configuration related to the invention according to this embodiment in the image formation apparatuses 101 and 103 not having a function of directly cooperating with the blockchain apparatus 111. Each processing unit is a software function that is implemented by the CPU 201 by executing a control program stored in the ROM 202 or a program stored in the HDD 204 unless otherwise specified.

An application 400 has a function of receiving a document from the PC 120 via the network I/F 208, and instructing a printing function unit 402 to print out the document. The application 400 can also provide a function of converting a scanned document into an electronic document and saving the document in the HDD 204, and a function of transmitting the document to the PC 120 via the network I/F 208, or a function of printing the document as a copy. The application 400 has a function of providing screen information to a UI control unit 401, and performing processing by accepting a user's instruction therefrom. The printing function unit 402 has a function of printing a document, printing of which is instructed by the application 400, via the printer I/F 206. The application 400 will also be called a blockchain incompatible application hereinafter.

Figure 4B:
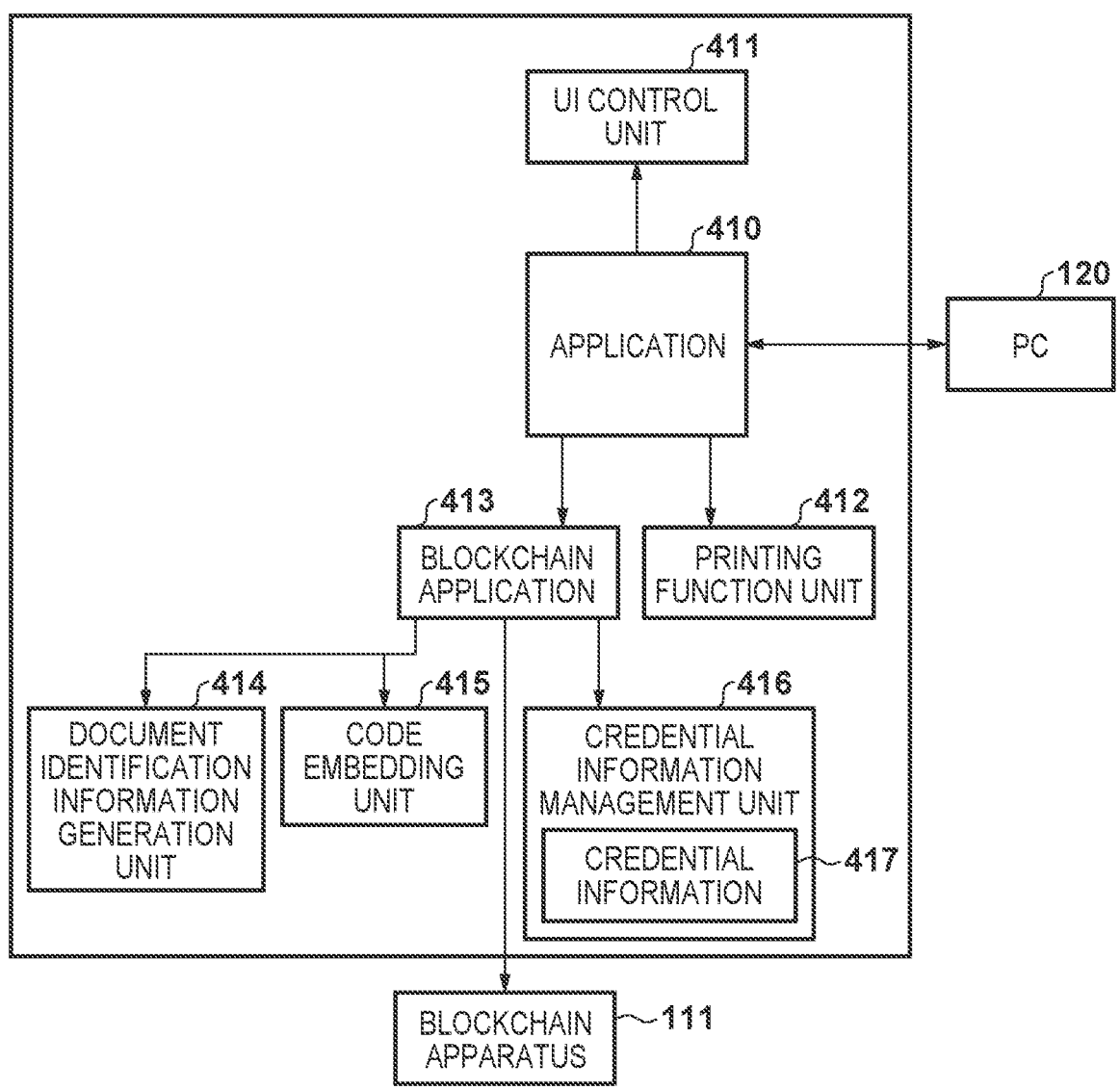
FIG. 4B is a view showing the software configuration of the image formation apparatus.

FIG. 4B is a block diagram showing a software configuration related to the invention according to this embodiment in the image formation apparatus 102 having the function of directly cooperating with the blockchain apparatus 111. Each processing unit is a software function that is implemented by the CPU 201 by executing a control program stored in the ROM 202 or a program stored in the HDD 204 unless otherwise specified.

An application 410 provides a function of receiving, via the network I/F 208, a document from the PC 120 and instructing a printing function unit 412 to print the document. The application 410 can also provide a function of converting a scanned document into an electronic document and saving the electronic document in the HDD 204, and transmitting the document to the PC 120 via the network I/F 208, or printing the document as a copy. The application 410 has a function of providing screen information to a UI control unit 411, and performing processing by accepting a user's instruction therefrom. The printing function unit 412 has a function of printing a document, printing of which is instructed by the application 410, via the printer I/F 206. The application 410 further provides a function of registering document information in the blockchain apparatus 111 via a blockchain application 406, and a function of verifying whether a scanned document is already registered in the blockchain apparatus 111. When registering document information in the blockchain apparatus 111, the application 410 receives, from a blockchain application 413, image data in which document identification information for identifying the document is embedded, and instructs the printing function unit to print out the image data. The application 410 will also be called a blockchain compatible application hereinafter.

Figure 7A:
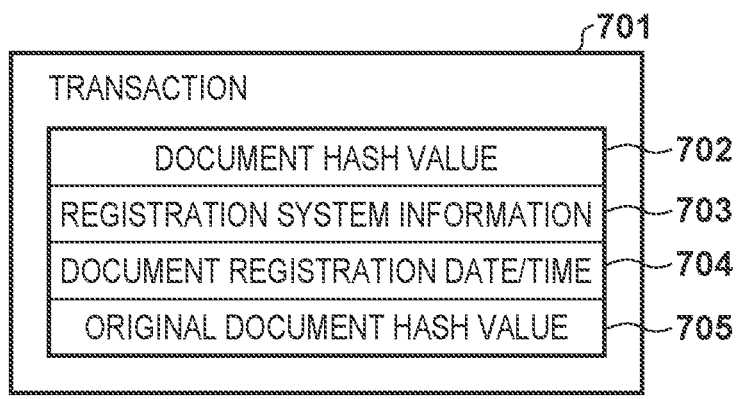
FIG. 7A is a view showing the data configuration of a transaction in the blockchain apparatus.
Figure 7B:
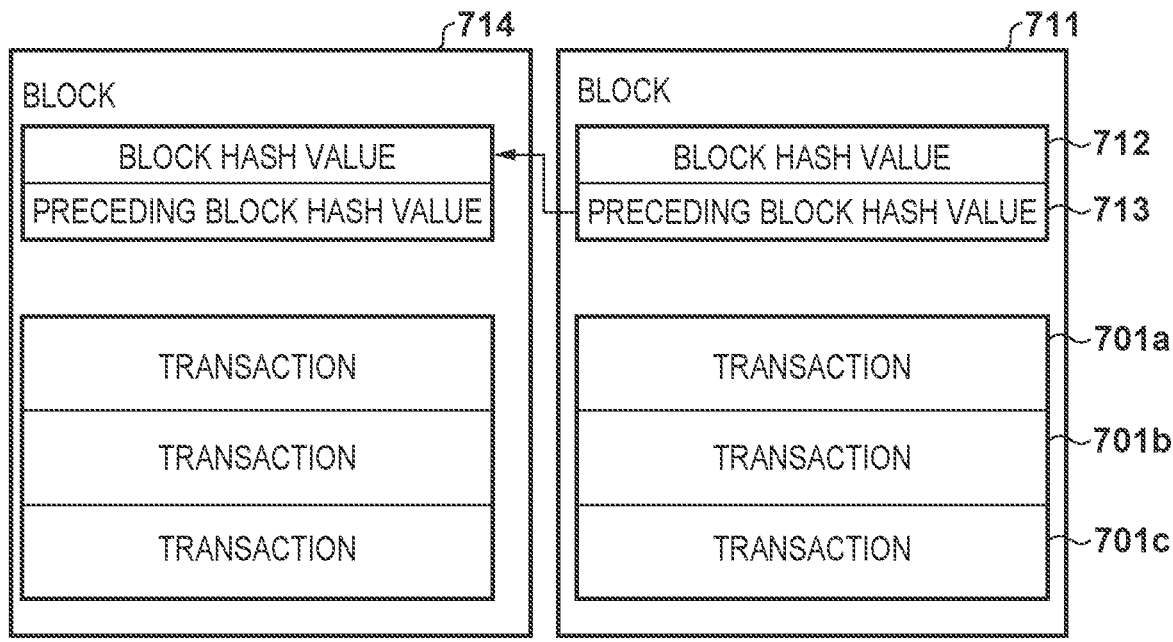
FIG. 7B is a view showing the data configuration of blocks.

The blockchain application 413 is an application for cooperating with a blockchain, and provides a function of accepting an instruction from the application 410, registering document information in the blockchain apparatus 111, and verifying the information. The blockchain application 413 further provides a function of embedding, in image data of a document to be printed, document identification information for identifying the document as a code having a predetermined format or a designated format, via a document identification information generation unit 414 and a code embedding unit 415. FIGS. 7A and 7B illustrate examples of the data structures of a transaction and blocks which the blockchain application 413 registers in the blockchain apparatus 111. Details of these data structures will be described later.

The document identification information generation unit 414 provides a function of generating document identification information corresponding to a document to be printed. The document identification information generation unit 414 generates document identification information by receiving an instruction from the blockchain application 413. In this embodiment, a hash value is calculated based on credential information 407 of the image formation apparatus 101 and on the timestamp of printing, and this hash value is used as document identification information. However, the calculation method is not limited to this one. Then, the document identification information generation unit 414 transfers the generated document identification information to the blockchain application 413.

The code embedding unit 415 provides a function of embedding document identification information for identifying a document to be printed, in image data of the document. The code embedding unit 415 receives image data of a document to be printed and document identification information transferred from the blockchain application 413, and accepts a code embedding instruction therefrom. The code embedding unit 415 converts the transferred document identification information into a selected type of or a predetermined type of coded image data, and synthesizes this image data with the image data of the document to be printed. This coding converts the document identification information into a two-dimensional barcode such as a QR Code®. However, the code is not limited to this one, and can also be a code obtained by another system pattern, a code that is human-readable information, or a code that is difficult to recognize by human eyes. Then, the code embedding unit 415 transfers the image data obtained by synthesizing the document identification information code with the document data to the blockchain application 413.

A credential information management unit 416 provides a function of managing credential information 417 in the image formation apparatus 102. The credential information management unit 416 receives an instruction from the blockchain application 413, and transfers the credential information 417 to the blockchain application 413.

The credential information 417 is credential information for ensuring that the image formation apparatus 102 is an authorized apparatus that uses the blockchain apparatus 111. For example, an organization operating this system can issue the credential information 417 for each manufacturer of an apparatus. The credential information 417 can be incorporated into the firmware of the image formation apparatus 102 before shipment, and can also be installed in the image formation apparatus 102 after shipment. Note that the credential information can be any of a digital certificate, a key pair of a private key and a public key, and a predetermined data value, that is, the actual condition of the credential information is not limited. The credential information can have different values for different applications.

When receiving an instruction for the blockchain apparatus 111 from the application 410, the blockchain application 413 also receives the credential information 417 from the credential information management unit 416. When transmitting an instruction to the blockchain apparatus 111, the blockchain application 413 also transmits the credential information 417. Only in a case where verification is successful, the instruction transmitted to the blockchain apparatus 111 is executed. Note that this embodiment has shown a configuration example in which the image formation apparatus 102 itself generates document identification information and embeds a code, but another configuration may also be adopted. An example is a configuration in which the blockchain support apparatus 112 is instructed to generate document identification information or embed a code via a cooperation function such as a blockchain support cooperation unit 505 (to be described later) included in the PC 120.

Driver Configuration

FIG. 5 is a block diagram showing a software configuration related to the invention according to this embodiment in the PC 120.

An application 500 is an application for giving an instruction to print electronic data such as a document, for example, a document processing application.

A trust driver 501 is an application for cooperating with a blockchain. The trust driver 501 provides a function of receiving a printing instruction from the application 500, registering information of a document in the blockchain apparatus 111, and instructing an image formation apparatus to perform printing via a printer driver. To print a blockchain cooperation document, the trust driver 501 provides a function of encoding document identification information to be registered in the blockchain apparatus 111 and embedding the code in data of a document to be printed, via the blockchain support apparatus 112. The trust driver 501 also has a function of determining whether an image formation apparatus as an object of a printing instruction satisfies the quality of trust printing, via the blockchain support apparatus 112. This embodiment restricts (more specifically, does not perform) printing by an image formation apparatus that does not satisfy the quality of trust printing, so this function is also a function of determining whether to permit trust printing in accordance with the performance of an image formation apparatus to be used in printing. In the following explanation, printing including generation of document identification information, code embedding, and blockchain registration will be called trust printing, and setting for this trust printing will be called trust printing setting. As described above, the trust driver 501 is software for supporting trust printing. Note that this embodiment shows an example in which whether to perform printing is determined based on the quality of trust printing of an image formation apparatus, but the condition is not limited to this example.

A control unit 502 receives a printing instruction from the application 500, and controls processes of a UI control unit 503, a printer cooperation unit 504, the blockchain support cooperation unit 505, a blockchain cooperation unit 506, and a default setting unit 509.

The UI control unit 503 provides a UI of the trust driver via the display 306. The UI control unit 503 displays the UI by receiving an instruction from the control unit 502, receives an operation from the user, and transfers the user input information to the control unit 502.

The printer cooperation unit 504 provides a function of receiving an instruction from the control unit 502 and obtaining information about a printer from each printer driver installed in the PC 120, and a function of instructing each printer driver to print out a document registered in a blockchain.

The blockchain support cooperation unit 505 provides a function of receiving an instruction from the control unit 502, and transmitting a printing feasibility determination instruction to the blockchain support apparatus 112, via the NIC 309. The printing feasibility determination instruction is an instruction for determining whether an image formation apparatus satisfies the performance of printing a document registered in a blockchain. When performing this printing feasibility determination instruction, the blockchain support cooperation unit 505 transmits printer information obtained from one of printer drivers 520, 530, and 540 to the blockchain support apparatus 112.

In addition, the blockchain support cooperation unit 505 provides a function of receiving an instruction from the control unit 502, transferring a document to be printed to the blockchain support apparatus 112, and instructing the blockchain support apparatus 112 to generate document identification information and embed a code, via the NIC 309. This embodiment shows a configuration in which the blockchain support cooperation unit 505 transfers document data for printing to the blockchain support apparatus 112. However, the data to be transferred can also be image data of a document to be printed, or electronic data having another file format. Also, this embodiment shows an example in which document identification information is encoded, but it is also possible to adopt a configuration in which information other than document identification information is contained in a code, or a configuration in which information other than document identification information that can be cooperating with a blockchain is processed as a code. After giving instructions to generate document identification information and embed a code, the blockchain support cooperation unit 505 receives image data in which the code of the document identification information is embedded from the blockchain support apparatus 112, and transfers the image data to the control unit 502.

The blockchain cooperation unit 506 provides a function of receiving an instruction from the control unit 502, and registering information of a document in the blockchain apparatus 111 via the NIC 309. FIGS. 7A and 7B illustrate an example of a transaction to be registered in the blockchain apparatus 111 by the blockchain cooperation unit 506, and an example of the data structure of a block, and details will be described later. The blockchain cooperation unit 506 instructs the blockchain apparatus 111 to register the generated document identification information via the blockchain support cooperation unit 505.

A credential information management unit 507 provides a function of managing credential information 508 in the trust driver 501. The credential information management unit 507 receives an instruction from the blockchain support cooperation unit 505 or the blockchain cooperation unit 506, and transfers the credential information 508.

The credential information 508 is credential information for ensuring that the trust driver 501 is an authorized software module that uses the blockchain apparatus 111 and the blockchain support apparatus 112. Note that the credential information can be any of a digital certificate, a key pair of a private key and a public key, and a predetermined data value, that is, the actual condition of the credential information is not limited. The credential information can have different actual conditions for different modules. When transmitting an instruction to the blockchain apparatus 111, the blockchain cooperation unit 506 also transmits the credential information 508. The blockchain apparatus 111 verifies the transmitted credential information, and, only when this verification is successful, the instruction transmitted to the blockchain apparatus 111 is executed.

The default setting unit 509 provides a function of managing a default setting value of the trust driver 501.

The printer driver 520 is a driver for cooperating with the image formation apparatus 101. The printer driver 520 has a function of providing information of the cooperated image formation apparatus in accordance with an instruction from the trust driver 501. The printer driver 520 also has a function of receiving a printing instruction and print data transferred from the trust driver 501, generating image data to be printed by the image formation apparatus 101, and transmitting the printing instruction and the generated image data to the image formation apparatus 101.

A control unit 521 receives a printing instruction from the trust driver 501, and controls processes in an image data generation unit 522 and a printer cooperation unit 523.

The image data generation unit 522 generates image data for printing suitable for the image formation apparatus 101 in accordance with an instruction from the control unit 521.

The printer cooperation unit 523 transfers information (for example, the model name, software version, manufacturer, and performance of the image formation apparatus) of the image formation apparatus 101 cooperating with the control unit 521, in accordance with an instruction from the control unit 521. Alternatively, the printer cooperation unit 523 transfers a printing instruction and image data to the image formation apparatus 101, in accordance with an instruction from the control unit 521.

The printer driver 530 is a driver for cooperating with the image formation apparatus 102. Compared to the printer drivers 520 and 540, the printer driver 530 provides information indicating that the image formation apparatus 102 has a function capable of cooperating with the blockchain apparatus 111, as information of an image formation apparatus to be cooperated. Except this, the printer driver 530 basically need only have the same functions as those of the printer driver 520.

The printer driver 540 is a driver for cooperating with the image formation apparatus 103, and need only have the same functions as those of the printer driver 520. Accordingly, an explanation of this driver will be omitted.

Software of Blockchain Apparatus

FIG. 6A is a block diagram showing a software configuration related to this embodiment in the blockchain apparatus 111 of this embodiment.

A control unit 601 receives a process instruction transmitted to the blockchain apparatus 111 from an external apparatus such as the image formation apparatus 102 or the PC 120, via the NIC 309. Upon receiving the instruction from the external apparatus, the control unit 601 executes an authentication function of an authentication processing unit 602, and then executes a blockchain management function of a block data management unit 604. After that, the control unit 601 transmits the processing result to the external apparatus via the MC 309.

The authentication processing unit 602 provides a function of authenticating apparatuses, systems, and users that use the service of the blockchain apparatus 111. An account information DB 603 holds information of apparatuses and systems that use the service. Table 1 shows an example of the information held in the account information DB 603. Table 1 shows an example in which the account name of the image formation apparatus 102 and the account name of the trust driver 501 are registered. However, another information processing apparatus or system, or user information can also be registered.

TABLE 1

| Account Information |
|---|
| Account Name |
| Image Formation Apparatus 102 |
| Trust Driver 501 |

The authentication processing unit 602 performs the authentication process by collating credential information such as the credential information 417 or 508 with the information in the account information DB 603. The authentication processing unit 602 can perform the authentication process by decoding credential information such as the credential information 417 or 508, and determining whether the decoded character string matches the account name. Information to be saved in the account information DB 603 can be saved beforehand by the manager of the blockchain apparatus 111.

The block data management unit 604 performs blockchain processing, for example, generates a transaction for registration, generates a block, writes a distributed ledger 605, and performs a process of referring to the distributed ledger 605. When a process instruction and a transaction are received from an external apparatus, the block data management unit 604 stores information of the received transaction in a transaction for registration, thereby generating the transaction for registration. The data configuration of the transaction for registration is the same as that of a transaction shown in FIG. 7A. The data configuration of a block will also be described later with reference to FIG. 7B. The distributed ledger 605 provides a function of holding a block. Generally, a plurality of nodes (computers) manage a ledger in a blockchain, so a plurality of block data management units 604 and a plurality of distributed ledgers 605 can exist.

Software of Blockchain Support Apparatus

Figure 6B:
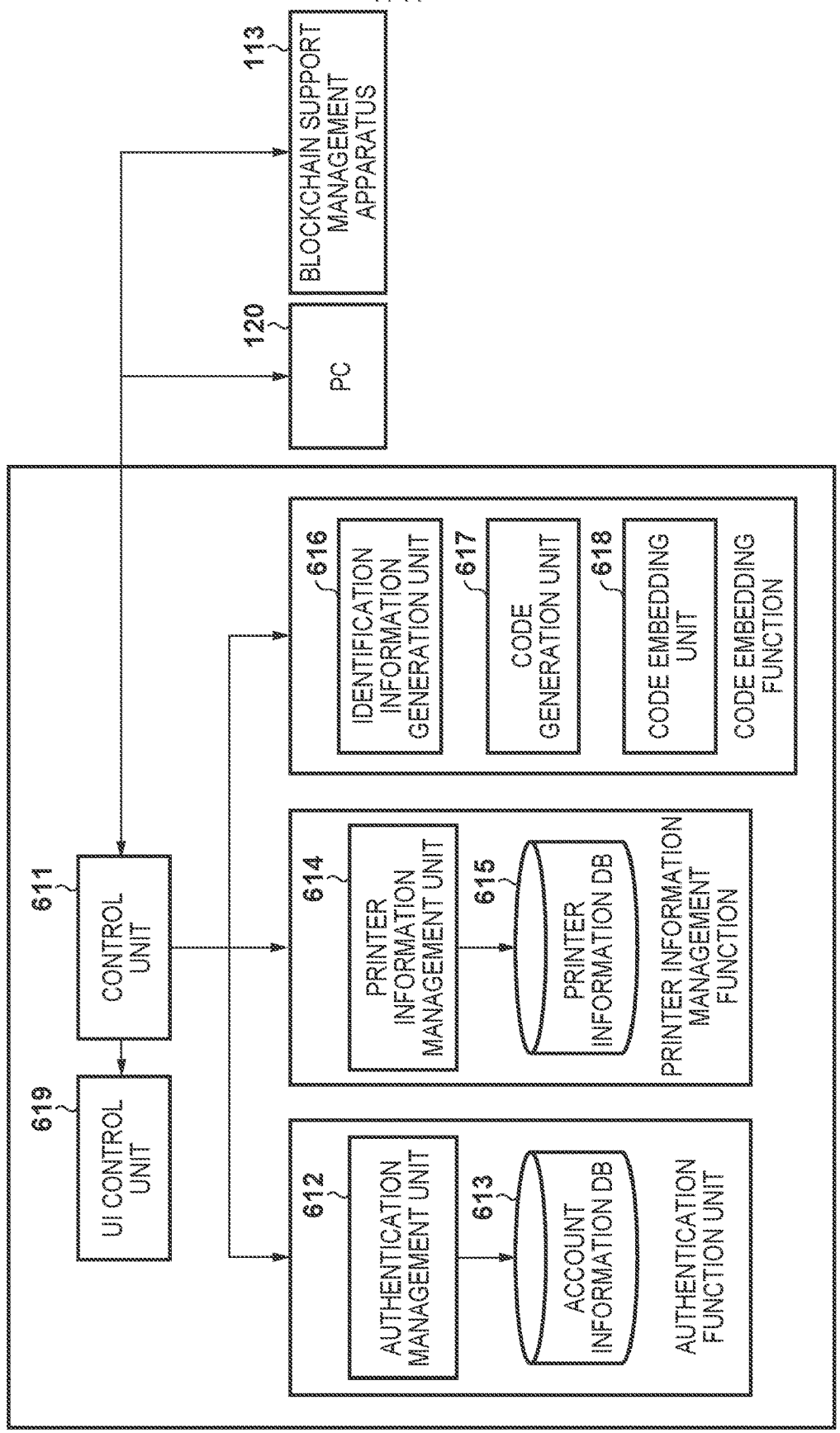
FIG. 6B is a view showing the software configuration of a blockchain support apparatus.

FIG. 6B is a block diagram showing a software configuration related to this embodiment in the blockchain support apparatus 112 of this embodiment. This embodiment shows the blockchain apparatus 111 and the blockchain support apparatus 112 as different apparatuses, but the blockchain apparatus 111 can also include the functions of the blockchain support apparatus 112.

A control unit 611 receives a process instruction from an external apparatus such as the PC 120 via the NIC 309. Upon receiving this instruction from the external apparatus, the control unit 611 executes an authentication function, and then executes a function corresponding to the instruction, such as a printer information management function or a code embedding function. After that, the control unit 611 transmits the processing result to the external apparatus via the NIC 309. This embodiment shows the configuration in which an apparatus that communicates with the blockchain support apparatus 112 is the PC 120. However, communication can also be performed with another information processing apparatus such as an image formation apparatus.

An authentication management unit 612 provides a function of authenticating a system that uses the service of the blockchain support apparatus 112, and a function of performing management (addition, update, or delete of an account) of authentication information. An account information DB 613 holds information of a system that uses the service. Table 2 shows an example of the information held in the account information DB 613.

TABLE 2

Account Information

| Account Name | Authorization | Password |
|---|---|---|
| Trust Driver 501 | General | — |
| Blockchain Support Management Apparatus 113 | Management | H23a58qk |

Table 2 holds account information by relating the account name, the authorization, and the password. Table 2 shows an example in which the account information of each of the trust driver 501 and the blockchain support management apparatus 113 is registered. However, it is also possible to register another information processing apparatus or system, or user information.

The authentication management unit 612 performs the authentication process by collating the credential information 508 with the information in the account information DB 613. Alternatively, the authentication management unit 612 performs the authentication process by receiving the account name and the password, and collating them with the information in the account information DB 613. If the collation result shows matching between the information, it is determined that the authentication is successful.

The authentication management unit 612 can perform the authentication process by decoding the credential information 508, and determining whether the decoded character string matches the account name. Account information of general authorization to be saved in the account information DB 613 can be saved beforehand by the manager of the blockchain support management apparatus 113, and account information of management authorization can be saved beforehand by the manager of the blockchain support apparatus 112.

A printer information management unit 614 determines whether a printer information DB 615 contains information of an image formation apparatus as an object of a printing feasibility determination instruction. If this information is contained, the printer information management unit 614 provides a function of transmitting the information contained in the printer information DB 615 as the result to the apparatus having issued the instruction, via the control unit 611. The printer information management unit 614 also provides a function of performing management (addition, update, or delete of printer information) of the printer information DB 615. The printer information DB 615 holds information of an image formation apparatus satisfying the printing quality, that is, information of an image formation apparatus permitted to print image data in which a code is embedded, from among image formation apparatuses not directly cooperating with the blockchain apparatus 111. The printer information management unit 614 determines printing feasibility by collating information of an image formation apparatus as an object of the printing feasibility determination instruction with information in the printer information DB 615. If the collation result shows that the conditions indicated by the information in the printer information DB 615 are met, it is determined that the corresponding image formation apparatus can print out the code-embedded image. Upon receiving the printing feasibility determination instruction from the PC 120, the control unit 611 transmits the printing feasibility determination result of the printer information management unit 614 to the PC 120. Table 3 shows an example of the information held in the printer information DB 615.

TABLE 3

Information of Image Formation Apparatus for Which Printing Is Permitted

| Model Name | Version | Manufacturer | DB Update Date | Code System | Performance |
|---|---|---|---|---|---|
| Image Formation Apparatus 101 | From V1.0 | Company A | 2021 Dec. 14 | QR Dot Pattern | 300 dpi Monochrome Printing |
| . . . | . . . | . . . | . . . | . . . | . . . |

The information in the printer information DB 615 shown in Table 3 holds information of an image formation apparatus, such as "Model Name", "Version", "Manufacturer", "Date of Update", "Code System", "Performance", and "Remarks". "Model Name" holds the name of the image formation apparatus 101. "Version" holds the version (for example, the software version) of the image formation apparatus. In this example, "From V1.0" is written, and this indicates that the image formation apparatus 101 found to have a version from V1.0 can perform printing. The version expression method is not limited to this, and a wildcard "*" can also be used when indicating a specific version, when designating the range of a version, or when there is no restriction by versions. "DB Update Date" holds the date/time when the information of the image formation apparatus 101 is added or updated. "Code System" holds the system of a code by which the image formation apparatus 101 sufficiently satisfies the printing quality. "Code System" shows that the image formation apparatus 101 sufficiently satisfies the printing quality if the code to be printed is the QR system or the dot pattern system hardly recognizable by human eyes. The code system expression is not limited to this, and it is also possible to use another system, or a wildcard "*" when there is no restriction by the code system. "Performance" holds the performance and function of an image formation apparatus pertaining to the printing quality, such as the image resolution and color printing. Although "Performance" shows 300 dpi and Monochrome Printing, it is possible to use another expression method, such as another performance, another function, or a method of designating a range.

Information of an image formation apparatus to be saved in the printer information DB 615 need only be saved in advance by the manager of the blockchain support apparatus 112. For example, the manager or manufacturer of the blockchain support apparatus 112 verifies the printing quality of an image formation apparatus, and adds the information to the DB based on the verification result after it is determined that the image formation apparatus has sufficient performance. Note that this embodiment shows an example in which the printer information DB 615 holds information of an image formation apparatus satisfying the printing quality, but the reference is not limited to the printing quality. For example, the printer information DB 615 can also hold information of an image formation apparatus for which the manager of the blockchain support apparatus 112 permits trust printing, or information of an image formation apparatus complying with another reference.

In addition, this embodiment shows a configuration in which the printer information DB 615 holds information of an image formation apparatus not directly cooperating with the blockchain apparatus 111, but the DB can also hold information of an image formation apparatus directly cooperating with to the blockchain apparatus 111. In this case, the printer information DB 615 need only hold information of the image formation apparatuses 101 and 102. Furthermore, this embodiment shows information of an image formation apparatus, but the information is not limited to this and may also be information of an apparatus or system taking part in printing, such as information of a printer driver or information of a system cooperating with an image formation apparatus. This embodiment has shown a configuration in which information of an image formation apparatus permitted to perform trust printing is registered in the printer information DB 615 and handled as a white list. To the contrary, it is also possible to register information of an image formation apparatus not permitted to perform trust printing in the printer information DB 615, and handle this information as a black list.

In the example shown in Table 3, information of each image formation apparatus is registered in the DB. However, if a condition for permitting trust printing is predetermined and an image formation apparatus satisfying the condition is supposed to be registered, only the identification name of the corresponding image formation apparatus can be registered in the DB. Alternatively, the feasibility of trust printing can also be determined based on not the identification name of an image formation apparatus but its performance alone. In this case, necessary performance and the format of a code for which printing is permitted in accordance with the performance are registered in the DB, and trust printing is permitted to an image formation apparatus satisfying these conditions.

An identification information generation unit 616 generates document identification information based on a document received from the PC 120, in accordance with an instruction from the control unit 611. As the identification information, it is possible to use a hash value calculated based on the credential information 508 received from the PC 120 and the date/time.

A code generation unit 617 generates a code based on the document identification information generated by the identification information generation unit 616 and converts the generated code into image data, in accordance with an instruction from the control unit 611. The code system need only comply with a code system designated from the PC 120. Note that this embodiment shows a configuration in which the user designates a code system via the UI of the trust driver 501, but a configuration in which the blockchain support apparatus 112 designates a code system and the code generation unit 617 complies with the designated code system is also possible.

A code embedding unit 618 synthesizes image data of the code generated by the code generation unit 617 with a document received from the PC 120, in accordance with an instruction from the control unit 611.

When instructed to perform code embedding from the PC 120, the control unit 611 transmits, to the PC 120, the document identification information generated by the identification information generation unit 616 and the image data obtained by synthesizing the code data to the document by the code embedding unit 618.

A UI control unit 619 provides a screen for account management by the authentication management unit 612, and for management of the printer information DB by the printer information management unit 614, in accordance with an instruction from the control unit 611. Upon receiving an instruction for a management function from the blockchain support management apparatus 113, the control unit 611 transmits a management function screen to the blockchain support management apparatus 113 by using the UI control unit and the authentication management unit 612 or the printer information management unit 614.

Structure of Information Block

FIGS. 7A and 7B are block diagrams showing a transaction 701 to be held in the blockchain apparatus 111 and the data structure of a block storing a plurality of transactions. The blockchain apparatus 111 is an apparatus for managing data by a system called a blockchain. This blockchain handles information by a unit called a transaction, and manages the transaction by a unit called a block containing one or a plurality of transactions.

Blocks are kept connected together by defining the relations of each individual block to blocks before and after that. Also, the blockchain is managed by a plurality of computers called nodes, and all the nodes manage equal block data. To falsify block data, therefore, a plurality of corresponding nodes must be updated, so the blockchain is known as a data management method having a high tamper resistance. Note that the blockchain apparatus 111 described in this specification is an apparatus including a plurality of computers as described above, and these computers provide the blockchain service.

In this embodiment, when the image formation apparatus 102 and the PC 120 process a document, a transaction containing a document hash value is transmitted to the blockchain apparatus 111 to perform block management, thereby holding the correct state of the document. This makes it possible to confirm that the document surely exists at a certain point of time. In this embodiment, the document hash value is used as an example of information for identifying each transaction. However, it is also possible to use identification information based on another information, such as an ID given a serial number, or a timestamp.

The transaction 701 to be transmitted by the image formation apparatus 102 and the PC 120 when registering a document in the blockchain apparatus 111 contains the following information.

A document hash value 702 is a hash value calculated to uniquely represent a target document. For example, this hash value can be calculated by executing a predetermined hash function based on the credential information 417 of the image formation apparatus 102, or the credential information 508 of the PC 120, and on the timestamp of a printing instruction. The hash value to the stored in the document hash value 702 is also called document identification information. However, the calculation method is not limited to this one.

Registration system information 703 is information for identifying the image formation apparatus 102 or the PC 120 having registered the document. In this embodiment, the value of the credential information 417 or the credential information 508 is stored.

Document registration date/time 704 is information representing the point of time at which the document is registered. FIG. 7A shows a configuration in which the image formation apparatus 102 or the PC 120 stores the registration date/time in the transaction. However, the blockchain apparatus 111 can also store the registration date/time.

In an original document hash value 705, the control unit 501 stores a hash value calculated based on document data received from the application 500.

The structure of a block holding the transaction 701 will be explained below by using a block 711. The block 711 schematically shows a general blockchain structure. The block 711 holds transactions 701a to 701c, and a block hash value 712 calculated from these transactions. The number of transactions 701 to be contained in a block is three in this embodiment, but the number of transactions is not limited.

The block 711 also holds a preceding block hash value 713 for connecting blocks. In this embodiment, the block hash value of a block 714 is stored in the preceding block hash value 713, thereby representing the relation between the blocks. Although the preceding block hash value is managed in this embodiment, it is also possible to manage a succeeding block hash value, or hash values of both preceding and succeeding blocks.

User Interface

FIGS. 8A to 8E illustrate screen examples to be displayed on the display of the PC 120 by the trust driver 501.

A printing setting screen 800 shown in FIG. 8A is a printing setting screen to be displayed by the trust driver 501 via the UI control unit 506 when the application 500 instructs the trust driver 501 to perform printing. A printer selection area 801 is an area for selecting an image formation apparatus to be used in printing. The printer selection area 801 displays a currently selected image formation apparatus. When the printer selection area 801 is pressed, a list of selectable image formation apparatuses is displayed as a pulldown menu 810, and the selection of an image formation apparatus is accepted.

A printer property button 802 is a button for displaying device information 820 of an image formation apparatus displayed in the printer selection area 801.

A trust printing setting area 803 is an area for performing trust printing setting. If an image formation apparatus incapable of performing trust printing or an image formation apparatus incapable of performing part of trust printing setting is selected, the trust printing setting area 803 is masked, or some setting items that cannot be performed in the trust printing setting area 803 are masked. Examples of the way of masking are grayout and non-display. FIG. 8A shows a screen example capable of setting trust printing, that is, setting whether to register a printing document in a blockchain, setting whether to perform blockchain registration page by page, and selecting a code system to be embedded in a printing document.

A printing finish area 804 is an area for setting general printing finish such as a sheet size, the number of copies, and the direction of printing. A printing start button 805 is a button for starting printing.

The pulldown menu 810 shown in FIG. 8B is a pulldown menu for selecting an image formation apparatus for use in printing. Device information 820 shown in FIG. 8C is a screen for displaying device information of the image formation apparatus for use in printing. FIG. 8C shows an example displaying the device information of the image formation apparatus, such as the model name, the manufacturer, the version, the serial number, and the IP address. These pieces of device information are displayed when, for example, a button (not shown) for displaying the device information is operated.

A default setting screen 830 shown in FIG. 8D is a screen for performing default setting of an image formation apparatus for use in printing. A printer selection area 801, a printer property button 802, a trust printing setting area 803, and a printing finish area 804 are the same as those shown in the printing setting screen 800, so an explanation thereof will be omitted. The default setting is displayed when, for example, a default setting button (not shown) displayed on a screen for selecting the printing setting screen 800 shown in FIG. 8A is operated, and is capable of, for example, changing the setting. A set button 831 is a button for setting, as the default setting, an image formation apparatus or printing setting selected in the printer selection area 801, the printer property button 802, the trust printing setting area 803, or the printing finish area 804. The default setting is saved in the default setting unit 509.

A printing setting screen 840 shown in FIG. 8E is a printing setting screen to be displayed when an image formation apparatus or printing setting is set in default setting. The default setting screen 830 can be displayed in accordance with an operation of a button or the like that is displayed on a screen for selecting the printing setting screen 800 shown in FIG. 8A and used to select default setting. The default setting screen 830 can also be displayed when a separately designated default printer is selected.

A printing printer area 841 displays an image formation apparatus selected as default setting. A printer property button 802, a trust printing setting area 803, and a printing finish area 804 are the same as those shown on the printing setting screen 800, so an explanation thereof will be omitted.

A printer select button 842 is a button for displaying a screen for reselecting an image formation apparatus when performing printing by using an image formation apparatus other than the image formation apparatus selected by default setting. As this screen for reselecting an image formation apparatus, the printing setting screen 800 can be displayed when, for example, the printer select button 842 is pressed.

Figure 8F:
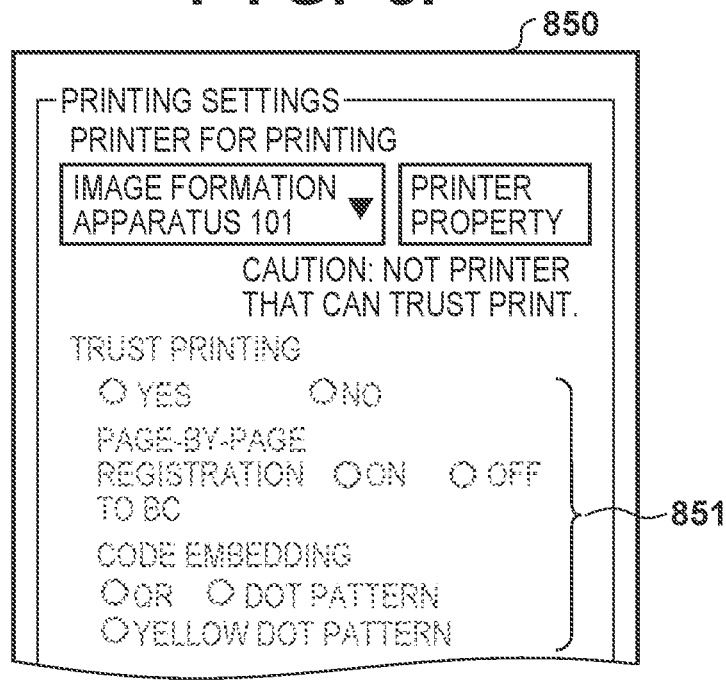

A printing setting screen 850 shown in FIG. 8F is a printing setting screen to be displayed by the trust driver 501 via the UI control unit 506 when the image formation apparatus 103 is selected in the pulldown menu 810 by pressing the printer selection area 801. A trust printing setting area 851 is a trust printing setting area in which setting functions are masked. Since the image formation apparatus 103 is an image formation apparatus that is not permitted to perform trust printing, the trust printing setting area 851 is masked so that setting selected by the user is not reflected.

Screen Examples for Managing Printer Information DB

FIGS. 8G to 8I are screen examples for managing the printer information DB, which the blockchain support apparatus 112 transmits to the blockchain support management apparatus 113 via the NIC 309. When the blockchain support apparatus 112 transmits screen data, the screen examples shown in FIGS. 8G to 8I are displayed on the display 306 of the blockchain support management apparatus 113. For example, when the blockchain support management apparatus 113 transmits a management instruction to the blockchain support apparatus 112, the screens shown in FIGS. 8G to 8I are transmitted to the blockchain support management apparatus 113 in accordance with the instruction. This is executed by a procedure shown in FIG. 9D.

A printer information DB management screen 860 shown in FIG. 8G is a management screen for browsing and managing information in the printer information DB 615. A management table 861 is a table for displaying information in the printer information DB 615. The management table 861 displays information of image formation apparatuses shown in Table 3 for which printing is permitted, and a check box for selecting an image formation apparatus. When the user selects a specific image formation apparatus in the management table 861 displayed on the display 306 of the blockchain support management apparatus 113 by using the keyboard/mouse 307, a check mark appears in the check box, so the image formation apparatus is selected.

A printer addition button 862 is a button for adding information of an image formation apparatus. When the user presses the printer addition button 862, the screen changes to a printer information addition screen 870 shown in FIG. 8H.

An information update button 863 is a button for updating information of an image formation apparatus in the printer information DB 615. When the user presses the information update button 863, the screen changes to a printer information update screen 880 shown in FIG. 8I.

A printer delete button 864 is a button for deleting information of an image formation apparatus selected in the management table 861 from the printer information DB 615. When the user presses the printer update button 863, information of an image formation apparatus selected in the management table 861 is deleted from the printer information DB 615 and the display of the management table 861.

The printer information addition screen 870 shown in FIG. 8H is a screen for adding information of an image formation apparatus to the printer information DB 615. An additional information area 871 is an area for inputting information of an image formation apparatus to be added to the printer information DB 615. A printer addition execute button 872 is a button for adding, to the printer information DB 615, the information of the image formation apparatus input in the additional information area 871. When the user presses the printer addition execute button 872, the screen changes to the printer information DB management screen 860 to which the input printer information is added.

The printer information addition screen 880 shown in FIG. 8I is a screen for updating information of an image formation apparatus in the printer information DB 615. An update information area 881 is an area for inputting the information of the image formation apparatus to be updated.

At the timing at which the printer information update screen 880 is displayed, the information of the image formation apparatus 101 in the printer information DB 615 is input in the update information area 881 from the beginning. An information update button 882 is a button for updating the information of the image formation apparatus in the printer information DB 615 to the information of the image formation apparatus input in the update information area 881. When the user presses the information update button 882, the screen changes to the printer information DB management screen 860.

Procedure of Printing Process

Figure 9A:
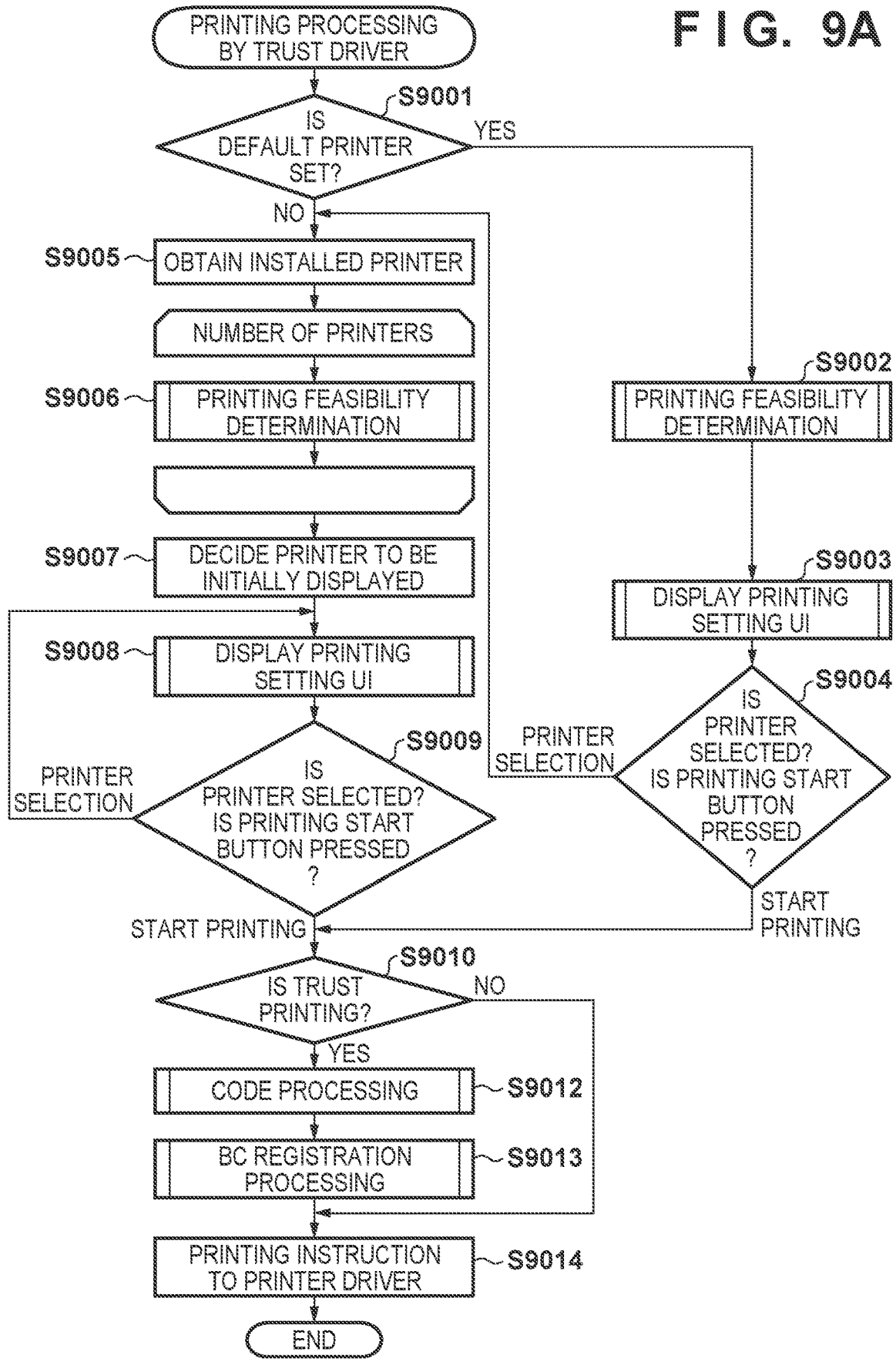
FIG. 9A is a flowchart for performing a printing instruction and default setting.

FIG. 9A is a flowchart showing the procedure of processing by which the trust driver 501 instructs one of the printer drivers 520, 530, and 540 to perform printing, and shows the procedure of a printing control method to be performed by the trust driver 501. When the application 500 transmits a printing instruction and data of a document to be printed to the trust driver 501, the control unit 502 of the trust driver 501 accepts the instruction and starts the processing.

In S9001, the control unit 502 determines whether a default printer is set in the default setting unit 508. If the default printer is set, the control unit 502 obtains information of an image formation apparatus and information of printing setting selected as the default setting from the default setting unit 508, and advances the process to S9002. If no default printer is set, the control unit 502 advances the process to S9005.

In S9002, the control unit 502 determines the printing feasibility of the image formation apparatus selected as the default setting. The process of this printing feasibility determination will be described later with reference to FIG. 9B. When the printing feasibility determination process is complete, the control unit 502 advances the process to S9003.

In S9003, the control unit 502 instructs the UI control unit 503 to display the UI. The process of this UI display will be described later with reference to FIG. 9C. When the UI display process is complete, the control unit 502 advances the process to S9004.

In S9004, the control unit 502 determines whether the printer select button 842 or the printing start button 805 is pressed by the user, via the UI control unit 503. The control unit 502 advances the process to S9005 if the printer select button 842 is pressed, and advances the process to S9010 if the printing start button 805 is pressed.

In S9005, the control unit 502 obtains, via the printer cooperation unit 504, information (the model name and the version) of each of usable image formation apparatuses from the printer drivers 520, 530, and 540 of these image formation apparatuses installed in the PC 120.

In S9006, the control unit 502 repeatedly performs printing feasibility determination on the image formation apparatuses obtained in S9005. The process of this printing feasibility determination will be described later with reference to FIG. 9B. When the printing feasibility determination process is complete, the control unit 502 advances the process to S9007.

In S9007, the control unit 502 decides an image formation apparatus to be initially displayed in the printer selection area 801. This embodiment shows an example in which the image formation apparatus 101 is selected, but another selection method may also be used. Examples are selection by the order of obtaining information in S9005, selection by the order of the model names, and selection of an image formation apparatus having performed printing last time.

In S9008, the control unit 502 instructs the UI control unit 503 to display the UI. The UI display process will be described later with reference to FIG. 9C. When the UI display process is complete, the control unit 502 advances the process to S9009.

In S9009, the control unit 502 determines, via the UI control unit 503, whether another image formation apparatus is selected from the printer selection area 801 by the user and the printing start button 805 is pressed by the user. The control unit 502 advances the process to S9008 if another image formation apparatus is selected from the printer selection area 801 by the user, and advances the process to S9010 if the printing start button 805 is pressed.

In S9010, the control unit 502 obtains, via the UI control unit 503, setting values set by the user in the trust printing setting area 803 and the printing finish area 804 of the printing setting screen 800. Then, the control unit 502 determines whether trust printing is set. The control unit 502 advances the process to S9012 if trust printing is set, and advances the process to S9014 if trust printing is not set.

In S9012, the control unit 502 transmits a code processing instruction and the setting designated in the trust printing setting area 803 to the blockchain support apparatus 112 via the blockchain support cooperation unit 505. When transmitting the code processing instruction, the blockchain support cooperation unit 505 transmits the credential information 508 obtained via the credential information management unit 507 to the blockchain support apparatus 112. The code processing of the blockchain support apparatus 112 will be described later with reference to FIG. 9D. When the code processing by the blockchain support apparatus 112 is complete, the blockchain support cooperation unit 505 receives document identification information and image data in which the code of the document identification information is synthesized on a document from the blockchain support apparatus 112. The control unit 502 obtains the document identification information and the image data in which the code of the document identification information is synthesized on a document from the blockchain support cooperation unit 505, and advances the process to S9013.

In S9013, the control unit 502 instructs the blockchain cooperation unit 506 to perform blockchain registration. The blockchain cooperation unit 506 generates a transaction to be transmitted to the blockchain apparatus 111. The document identification information received from the blockchain support apparatus 112 in S9012 is stored in the document hash value 702 of the transaction to be generated. The credential information 508 obtained via the credential information management unit 507 is stored in the registration system information 703. Date/time information at the point of time of this processing is stored in the document registration date/time 704. A hash value calculated based on the data of the document received by the control unit 501 from the application 500 is stored in the original document hash value 705. Then, the blockchain cooperation unit 506 transmits an instruction to register the generated transaction to the blockchain apparatus 111. The process of registering the transaction to the blockchain of the blockchain apparatus 111 will be described later with reference to FIG. 9E. When the registration instruction to the blockchain apparatus 111 is complete, the control unit 502 advances the process to S9014.

In S9014, the control unit 502 transmits, via the printer cooperation unit 504, a printing instruction to a printer driver corresponding to the image formation apparatus selected in the printer selection area 801 or the printing printer area 841. When performing trust printing, image data on which the code of the document identification information received from the blockchain support apparatus 112 in S9012 is synthesized is transmitted as a document to be printed. On the other hand, when trust printing is not to be performed, the control unit 502 designates a document received from the application 500 and transmits the document. As printing setting, the control unit 502 transmits the setting designated in the printing finish area 804. After the printing instruction is transmitted to the printer driver, the flowchart is terminated.

This embodiment has shown a configuration in which the blockchain support apparatus 112 is instructed in S9012 to generate and encode document identification information, generate an image of the code, and synthesize the code image on a document. As another configuration example, the trust driver 501 can be given the same functions as those of the identification information generation unit 616, the code generation unit 617, and the code embedding unit 618 of the blockchain support apparatus 112, and perform the code processing.

This embodiment has shown an example in which even an image formation apparatus for which trust printing is not permitted can be selected in the printer selection area 801 in S9007 or S9008. However, the present invention is not limited to this configuration, and a configuration in which an image formation apparatus (for example, the image formation apparatus 103) for which trust printing is not permitted is not displayed in the pulldown menu 810 is also possible.

This embodiment has shown a configuration in which the control unit 502 instructs a printer driver to perform printing via the printer cooperation unit 504 in S9014. However, the present invention is not limited to this configuration. For example, the trust driver 501 can also have printer driver functions (for example, the image data generation unit 522 and the printer cooperation unit 523) corresponding to an image formation apparatus to be used in printing, and directly instruct the image formation apparatus to perform printing.

In this embodiment, the trust driver 501 of the PC 120 includes the blockchain support cooperation unit 505, the blockchain cooperation unit 506, the credential information management unit 507, and the credential information 508. Therefore, even when using the image formation apparatus 101 that does not have a function of embedding document identification information in a paper document and a function of performing registration to the blockchain apparatus 111, a document to be printed can be cooperating with a blockchain by performing printing via the trust driver 501.

Printing Feasibility Determination Process

Figure 9B:
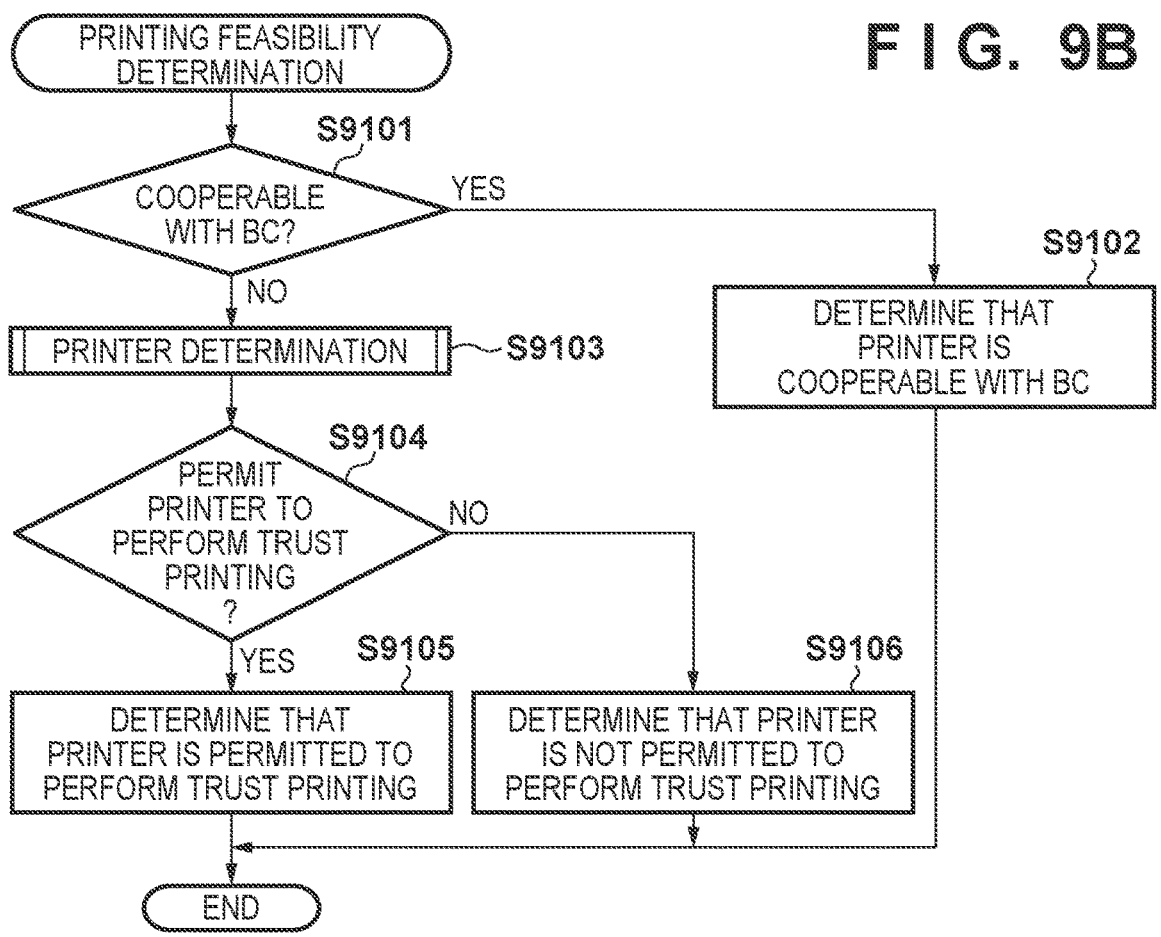
FIG. 9B is a flowchart of printing feasibility determination.

FIG. 9B shows details of the printing feasibility determination in S9002 and S9006 of FIG. 9A, and is a flowchart showing the procedure of a printing feasibility determination process to be executed by the control unit 502. This procedure starts when the control unit 502 designates a specific image formation apparatus and performs printing feasibility determination of the image formation apparatus in S9002 or S9006.

In S9101, the control unit 502 obtains information indicating whether the designated image formation apparatus can cooperate with the blockchain apparatus 111 from the printer driver 520, 530, or 540, and determines whether the image formation apparatus is cooperable with a blockchain. The control unit 502 advances the process to S9102 if the designated image formation apparatus has a function of cooperating with the blockchain apparatus 111, that is, if the image formation apparatus is blockchain-cooperable, and advances the process to S9103 if information indicating that the image formation apparatus has the cooperation function cannot be obtained.

In S9102, the control unit 502 determines that the designated image formation apparatus is a blockchain-cooperable image formation apparatus. In S9102, the determination result can be saved in a predetermined storage area by relating the result to the image formation apparatus as the determination target.

In S9103, the control unit 502 transmits a printer determination instruction to the blockchain support apparatus 112 via the blockchain support cooperation unit 505. When transmitting this printer determination instruction, the blockchain support cooperation unit 505 transmits the credential information 508 obtained via the credential information management unit 507 to the blockchain support apparatus 112. Also, as information of the image formation apparatus as an object of printer determination, the blockchain support cooperation unit 505 obtains information of the image formation apparatus such as the model name and the version from the printer driver 520, 530, or 540, and transmits the information to the blockchain support apparatus 112. The printer determination process in the blockchain support apparatus 112 will be described later with reference to FIG. 9D. When the printer determination process in the blockchain support apparatus 112 is complete, the blockchain support cooperation unit 505 receives the printer determination result from the blockchain support apparatus 112. If information of the designated image formation apparatus exists in the printer information DB 615, the printer determination result contains information of the image formation apparatus shown in Table 3. If information of the designated image formation apparatus does not exist, the printer determination result contains this result. The control unit 502 obtains the printer determination result from the blockchain support cooperation unit 505, and advances the process to S9104.

In S9104, the control unit 502 determines whether to permit the designated image formation apparatus to perform trust printing, that is, whether trust printing is possible, based on the printer determination result in S9103. If information of the designated image formation apparatus exists in the printer information DB 615 as the printer determination result, the control unit 502 determines that the image formation apparatus as the determination object can perform trust printing, and advances the process to S9105. On the other hand, if information of the designated image formation apparatus does not exist in the printer information DB 615, the control unit 502 advances the process to S9106.

In S9105, the control unit 502 determines that the designated image formation apparatus is an image formation apparatus to be permitted to perform trust printing. In S9106, the control unit 502 determines that the designated image formation apparatus is an image formation apparatus not to be permitted to perform trust printing. In S9105 and S9106, the determination result can be saved in a predetermined storage area by linking the result with the image formation apparatus as the determination object. The flowchart is terminated when processing in any of S9102, S9105, and S9106 is complete.

Note that this embodiment has shown an example in which printer determination is performed in S9103 by transmitting the information of the image formation apparatus obtained from the printer driver 520, 530, or 540 to the blockchain support apparatus 112. However, the present invention is not limited to this configuration. An example is a configuration in which information in the printer information DB 615 is downloaded from the blockchain support apparatus 112, and the control unit 502 collates this information with the information in the printer information DB 615.

Display of Printing Setting Screen (Printing Setting UI)

Figure 9C:
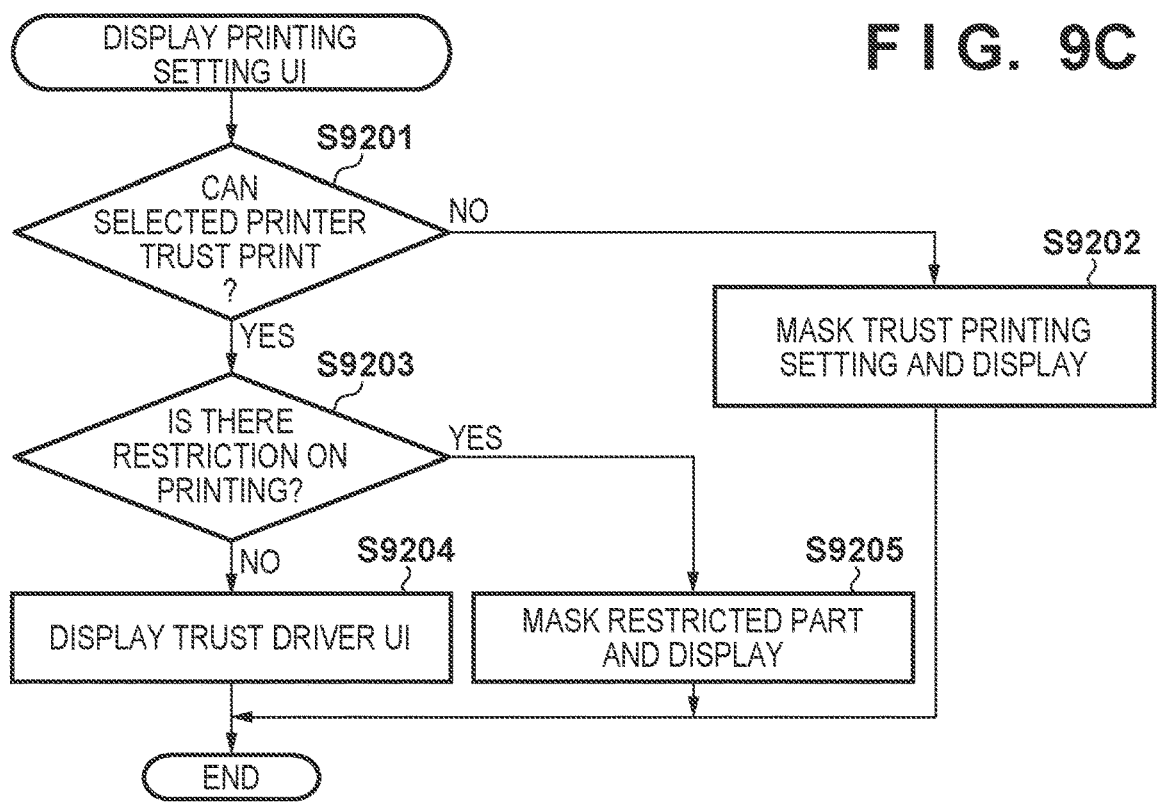
FIG. 9C is a flowchart for displaying a printing setting UI.

FIG. 9C shows details of S9003 and S9008 in FIG. 9A, and is a flowchart showing the procedure of processing in which the UI control unit 503 displays the printing setting screen 800 or 840. If the control unit 502 instructs the UI control unit to perform a driver UI display process in S9003 or S9008, this flowchart starts as a flowchart for displaying the printing setting screen 800. If the control unit 502 instructs the UI control unit to perform a driver UI display process in S9501, this flowchart starts as a flowchart for displaying the printing setting screen 840.

In S9201, the UI control unit 503 determines whether a selected image formation apparatus to be displayed in the printer selection area 801 is an image formation apparatus for which trust printing can be permitted. The UI control unit 503 advances the process to S9203 if it is determined in S9102 that the image formation apparatus is blockchain-cooperable, or if it is determined in S9105 that the image formation apparatus is permitted to perform trust printing. The UI control unit 503 advances the process to S9202 if it is determined in S9106 that the image formation apparatus is not to be permitted to perform trust printing. Note that an image formation apparatus to be selected first can be decided in accordance with, for example, the order of registration in the printer information DB 615, or a predetermined appropriate order giving priority to a BC-cooperable printer.

If it is determined that the selected image formation apparatus is incapable of trust printing, the UI control unit 503 masks the trust printing setting area 803 and displays the printing setting screen 800 or 840 in S9202.

If it is determined that the selected image formation apparatus is capable of trust printing, the UI control unit 503 determines in S9203 whether the image formation apparatus to be displayed in the printer selection area 801 has a restriction on printing setting. If information in the printer information DB 615 contains a restriction on printing setting as the printer determination result in S9103, the UI control unit 503 advances the process to S9205. For example, the code system is designated in the printer information DB 615 like the image formation apparatus 101 shown in Table 3, the UI control unit 503 determines that there is a restriction on code designation, and advances the process to S9205. The UI control unit 503 advances the process to S9204 if no restriction is designated in the printer information DB 615, or if it is determined in S9102 that the image formation apparatus is blockchain-cooperable.

In S9204, the UI control unit 503 displays the printing setting screen 800 or 840. In this case, there is no restriction on trust printing, and it is possible to select page-by-page registration to a blockchain and a code system, in addition to the presence/absence of designation of trust printing.

In S9205, the UI control unit 503 masks restricted trust printing setting or printing finish setting in the trust printing setting area 803 or the printing finish area 804, and displays the printing setting screen 800 or 840.

Masking is performed to limit selection by the user in accordance with restrictions on functions and performances contained in the printer information DB 615. For example, even when an image formation apparatus is found to be capable of trust printing, if a QR Code® alone is designated as the code system, a QR Code® is automatically selected as the code system, and a radio button of the code system is masked. Also, even when an image formation apparatus is found to be capable of trust printing, if the apparatus can form only a monochrome image, a radio button of yellow dot pattern as an option of the code system is masked. Furthermore, even when an image formation apparatus is found to be capable of trust printing, if a recordable pixel density does not satisfy a predetermined reference value, a radio button itself for selecting trust printing can be masked. On the other hand, even when a restriction is designated in the printer information DB 615, if this restriction does not limit the printing setting, the same UI as that displayed in S9204 can be displayed.

This flowchart is terminated when the UI control unit 503 completes the processing in any of S9202, S9204, and S9205.

Note that this embodiment has shown an example in which the process advances to S9203 if it is determined in S9201 that an image formation apparatus to be displayed in the printer selection area 801 is a blockchain-cooperable image formation apparatus. However, the present invention is not limited to this configuration. For example, a blockchain-cooperable image formation apparatus (for example, the image formation apparatus 102) can perform code processing by itself, so the process can advance to S9202 even when an image formation apparatus is blockchain-cooperable. In this case, it is possible to perform a process of cooperating the image formation apparatus with a blockchain with no exception, or to determine whether to cooperate with a blockchain in accordance with separately designated setting.

Processing of Blockchain Support Apparatus 112

Figure 9D:
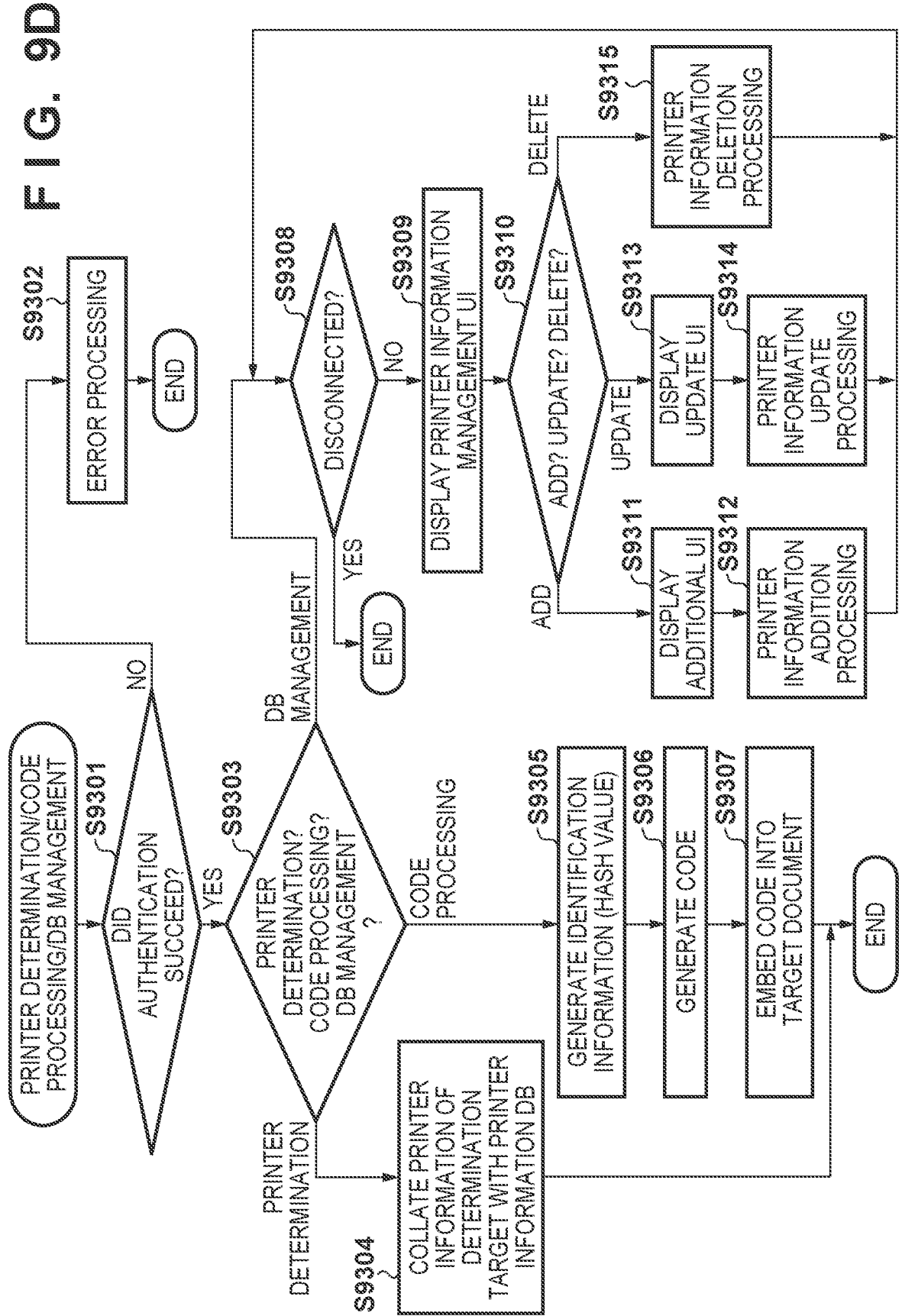
FIG. 9D is a processing flowchart to be performed by the blockchain support apparatus.

FIG. 9D is a flowchart showing the procedure of processing of the blockchain support apparatus 112. This flowchart starts when the control unit 502 gives an instruction to perform the printer determination process or the code processing via the blockchain support cooperation unit 505 and transmits the credential information 508 to the blockchain support apparatus 112 in S9103 or S9012. Alternatively, the flowchart starts when the blockchain support management apparatus 113 transmits a management instruction for the printer information DB 615, the account name, and the password to the blockchain support apparatus 112. Note that the blockchain support cooperation unit 505 transmits the model name and version of an image formation apparatus as an object of printer determination in the case of the printer determination process, and transmits a document to be printed and setting designated in the trust printing setting area 803 in the case of the code processing instruction. In S9301, the control unit 611 of the blockchain support apparatus 112 instructs the authentication management unit 612 to perform an authentication process. The authentication management unit 612 performs the authentication process by using the attached information in accordance with the instruction. That is, in the case of the printer determination instruction or the code processing instruction, the authentication management unit 612 determines whether account information corresponding to the credential information 508 exists in the account information DB 613, and transfers the result to the control unit 611. In the case of the management instruction for the printer information DB 615, the authentication management unit 612 determines whether the account name and the password match the account information DB 613, and transfers the result to the control unit 611. If account information corresponding to the account information DB 613 exists, the control unit 611 determines that authentication is successful, and advances the process to S9303. If these is no corresponding account information, the control unit 611 determines that there is an authentication error, and advances the process to S9302.

In S9302, the control unit 611 transmits the result of authentication error to the apparatus having transmitted the instruction, that is, the blockchain support cooperation unit 505 of the PC 120 or the blockchain support management apparatus 113.

In S9303, the control unit 611 determines whether the instruction from the blockchain support cooperation unit 505 is the printer determination instruction, the code processing instruction, or the management instruction for the printer information DB 615. The control unit 611 advances the process to S9304, S9305, or S9308 if the instruction is the printer determination instruction, the code processing instruction, or the DB management instruction, respectively.

In the case of printer determination, the control unit 611 determines in S9304 whether the printer information DB 615 contains data corresponding to the model name and version of the image formation apparatus as an object of printer determination, via the printer information management unit 614. If the printer information DB 615 contains the information, the control unit 611 transmits the information of the image formation apparatus in the printer information DB 615 as a determination result to the blockchain support cooperation unit 505. On the other hand, if no such information is contained, the control unit 611 transmits this result to the blockchain support cooperation unit 505.

In the case of code processing, in S9305, the control unit 611 instructs the identification information generation unit 616 to generate document identification information. The identification information generation unit 616 calculates a hash value from the credential information 508 and date/time information, and transfers this value as the document identification information to the control unit 611.

In S9306, the control unit 611 generates a code based on the document identification information generated in S9303, via the code generation unit 617. In this step, the code generation unit 617 generates image data of a code corresponding to the setting designated in the trust printing setting area 803.

In S9307, the control unit 611 synthesizes the image data of the code generated in S9306 and the document to be printed, via the code embedding unit 618, thereby generating image data of the document with a code. Then, the control unit 611 transmits this image data of the document with a code and the document identification information generated in S9305 to the blockchain support cooperation unit 505.

In the case of database management, in S9308, the control unit 611 determines whether the connection to the blockchain support management apparatus 113 is disconnected. If the connection is disconnected, the control unit 611 terminates the flowchart. If the connection is not disconnected and there is an instruction given via the UI control unit 619, the control unit 611 advances the process to S9309.

In S9309, the control unit 611 transmits the information of the printer information DB management screen 860, that is, the UI information to the blockchain support management apparatus 113 via the UI control unit 619. When the blockchain support management apparatus 113 receives this UI information, the display 306 of the blockchain support management apparatus 113 displays the printer information DB management screen 860. The user performs an operation such as addition, update, or delete of a printer on the screen 860.

When the operation is accepted on the displayed printer information DB management screen 860, the control unit 611 determines in S9310 whether the operation is an addition instruction, an update instruction, or a delete instruction for printer information. The control unit 611 advances the process to S9310 if the printer addition button 862 is pressed, to S9311 if the information update button 863 is pressed, and to S9312 if the printer delete button 864 is pressed.

In the case of addition, in S9311, the control unit 611 transmits the UI of the printer information addition screen 870 to the blockchain support management apparatus 113, via the UI control unit 619.

In S9312, at the timing at which the user presses the printer addition button 872, the control unit 611 instructs the printer information management unit 614 to save the information designated in the additional information area 871 in the printer information DB 615. When the addition of the information to the printer information DB 615 is complete, the control unit 611 transmits the UI of the printer information DB management screen 860 on which the information in the management table 861 is updated to the blockchain support management apparatus 113, via the UI control unit 619, and advances the process to S9308.

In the case of update, in S9313, the control unit 611 transmits the UI of the printer information update screen 880 pertaining to the image formation apparatus selected in the management table 861 to the blockchain support management apparatus 113, via the UI control unit 619.

In S9314, at the timing at which the information update button 882 is pressed, the control unit 611 instructs the printer information management unit 614 to update information of the image formation apparatus selected in the management table 861 to information designated in the update information area 881. When this update of the information to the printer information DB 615 is complete, the control unit 611 transmits the UI of the printer information DB management screen 860 on which the information in the management table 861 is updated to the blockchain support management apparatus 113, via the UI control unit 619, and advances the process to S9308.

In the case of delete, in S9315, the control unit 611 instructs the printer information management unit 614 to delete the image formation apparatus selected in the management table 861 from the printer information DB 615, via the UI control unit 619. When this delete of the information from the printer information DB 615 is complete, the control unit 611 transmits the UI of the printer information DB management screen 860 on which the information in the management table 861 is updated to the blockchain support management apparatus 113, via the UI control unit 619, and advances the process to S9308.

The flowchart is terminated when the control unit 611 completes the processing in any of S9302, S9304, and S9307, or when the communication with the blockchain support management apparatus 113 is disconnected in S9308.

Registration of Transaction

FIG. 9E is a flowchart showing the procedure of processing by which the blockchain apparatus 111 registers a transaction in a blockchain. This flowchart starts when the control unit 502 instructs the blockchain apparatus 111 to register a transaction, via the blockchain cooperation unit 506, in S9013. Note that when transmitting this registration instruction, the blockchain cooperation unit 506 transmits the credential information 508 and a transaction to be registered to the blockchain apparatus 111.

In S9401, the control unit 601 of the blockchain apparatus 111 instructs the authentication processing unit 602 to authenticate the credential information 508. The authentication processing unit 602 determines whether the account information DB 603 contains account information corresponding to the credential information 508. If the account information is contained, that is, if the authentication is successful, the control unit 601 advances the process to S9402. If the account information is not contained, that is, if an authentication error occurs, the control unit 601 advances the process to S9403.

In S9402, the control unit 601 instructs the block data management unit 604 to register the transaction. The block data management unit 604 registers the transaction in the distributed ledger 605. When this registration to the distributed ledger is complete, the control unit 601 transmits the result of registration completion to the blockchain cooperation unit 506.

In S9403, the control unit 601 transmits the result of authentication error to the blockchain cooperation unit 506.

The flowchart is terminated when the control unit 601 completes the processing in one of S9401 and S9402.

Setting of Default Printer

Figure 9F:
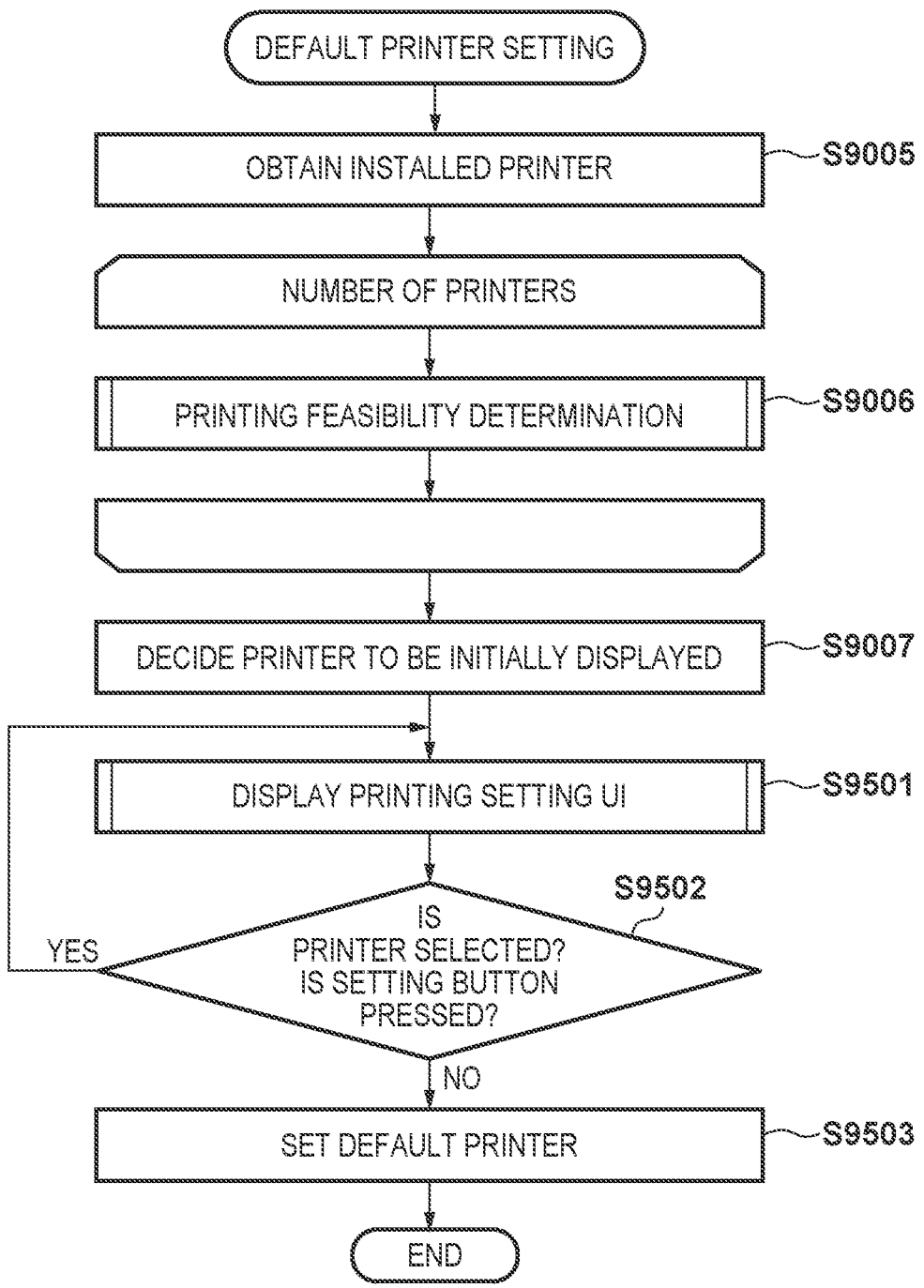
FIG. 9F is a flowchart of default printer setting.

FIG. 9F is a flowchart showing the procedure of processing by which the trust driver 501 sets a default printer. This flowchart starts when the PC 120 instructs the trust driver 501 to perform default setting. Note that processes in S9005 to S9007 are the same as those shown in FIG. 9A, so an explanation thereof will be omitted.

In S9501, the control unit 502 instructs the UI control unit 503 to display the printing setting UI. This UI display instruction is the process shown in FIG. 9C.

In S9502, the control unit 502 determines whether another image formation apparatus is selected from the printer selection area 801 by the user, or the setting button 831 is pressed by the user, via the UI control unit 503. The control unit 502 advances the process to S9501 if another image formation apparatus is selected from the printer selection area 801 by the user, and advances the process to S9503 if the setting button 831 is pressed.

In S9503, the control unit 502 obtains the image formation apparatus selected in the printer selection area 801 of the printing setting screen 840, and obtains setting values set in the trust printing setting area 803 and the printing finish area 804 of the printing setting screen 840, via the UI control unit 503. Then, the control unit 502 sets the image formation apparatus and the setting values as default setting, via the default setting unit 508. The flowchart is terminated when the control unit 502 completes the process in S9503.

In this embodiment as described above, the trust driver 501 transmits information of an image formation apparatus to be used in printing to the blockchain support apparatus 112, so the process of printer determination in S9304 can be performed before printing. In S9304, whether the printer information DB 615 contains the model name and version of the image formation apparatus of interest is determined. The image formation apparatus of interest is capable of trust printing if these pieces of information are contained, and incapable of trust printing if not. Then, settings pertaining to trust printing are masked in the UI of the trust driver 501 in accordance with the result. Consequently, it is possible to limit the function of embedding a code of document identification information, or the function of performing registration to the blockchain apparatus 111. Therefore, even in a configuration in which an external system of an image formation apparatus embeds a code or performs registration to a blockchain, an image formation apparatus for performing printing can be controlled.

Accordingly, registration of a document to a blockchain and printing (trust printing) can be controlled in accordance with restrictions imposed by the function and performance of an image formation apparatus to which the trust driver provides the function of registering print data to a blockchain. That is, trust printing is permitted if the performance of the image formation apparatus has reached a predetermined reference, and is not permitted if not. More specifically, the reference is that the image formation apparatus has a blockchain cooperation function or is provided with a trust driver, and can form an image by the number of pixels with which an embedded code indicating the authenticity of a document can be read and correctly decoded. If the size of the embed code to be formed as an image is limited, the number of pixels described above can also be rephrased as a resolution. Furthermore, even when trust printing is permitted, it is possible to limit options selectable in accordance restrictions imposed by the function and performance of an image formation apparatus, so unlimited trust printing that may lose the meaning of trust printing can be limited. The meaning of trust printing is the ability to read a code in a document formed as an image and verify the authenticity of the document. This embodiment performs control such that trust printing that may lose its meaning cannot be performed.

OTHER EMBODIMENTS

In this embodiment, an image formation system capable of ensuring the genuineness of the contents of a document to be printed by registering the document to a blockchain has been explained. However, the registration destination of a document is not limited to a blockchain, and can also be a system that ensures the contents of a document, that is, a document verification system capable of verifying a document by using a code that is printed together with the document. Note that the genuineness of a document can also be rephrased as authenticity, and indicates that the contents of the document are not falsified.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075366, filed Apr. 28, 2022 which is hereby incorporated by reference herein in its entirety.

What is claimed is:

1. An information processing system for supporting trust printing that prints a document to be printed by registering the document in a document assurance system that assures authenticity of the document, comprising:
   at least one memory storing at least one program; and
   at least one processor,
   wherein the at least one program causes the at least one processor to:
   obtain information of usable image formation apparatuses, and provide a setting screen of an image formation apparatus selected from the usable image formation apparatuses based on the obtained information,
   cause the selected image formation apparatus to print the document to be printed in accordance with a setting on the setting screen, and
   register the document to be printed and identification information of the document in the document assurance system in a case in which the trust printing is selected on the setting screen,
   wherein the obtained information contains information indicating whether the selected image formation apparatus is capable of the trust printing, and, in the providing the setting screen, if the selected image formation apparatus is incapable of the trust printing, the setting screen is displayed such that a setting item for the trust printing cannot be selected, and
   wherein the at least one program causes the at least one processor to, in the trust printing, cause the image formation apparatus to print the document to be printed by synthesizing the document and the identification information.

2. The system according to claim 1, wherein the obtained information contains information obtained from a driver of the selected image formation apparatus and indicating whether the image formation apparatus corresponds to the document assurance system, and, in the providing the setting screen, if the selected image formation apparatus corresponds to the document assurance system, it is determined that the trust printing is possible.

3. The system according to claim 2, wherein the obtained information contains information indicating whether the selected image formation apparatus is capable of the trust printing even in a case in which the selected image formation apparatus does not correspond to the document assurance system.

4. The system according to claim 3, wherein the obtained information contains information indicating a restriction imposed on the trust printing by the selected image formation apparatus, and, in the providing the setting screen, the setting screen is displayed such that a restricted setting item of setting items for the trust printing cannot be selected even in a case in which the selected image formation apparatus is capable of the trust printing.

5. The system according to claim 1, wherein in the trust printing, a code of a selected code system corresponding to the identification information is generated and synthesized on the document to be printed.

6. The system according to claim 5, wherein the obtained information contains information indicating the code system selectable as a restriction of the trust printing to be performed by the selected image formation apparatus, and, in the providing the setting screen, the setting screen displays the selectable code system.

7. The system according to claim 1, wherein
the at least one program causes the at least one processor to:
manage the obtained information of a usable image formation apparatus of the usable image formation apparatuses; and
in the managing, add the usable image formation apparatus, delete the usable image formation apparatus, or update the obtained information of the usable image formation apparatus.

8. A non-transitory computer-readable storage medium storing thereon a program which, when loaded into a computer and executed, causes the computer to execute a process, the process comprising:
obtaining information of usable image formation apparatuses, and providing a setting screen of an image formation apparatus selected from the usable image formation apparatuses based on the obtained information;
causing the selected image formation apparatus to print a document to be printed in accordance with a setting on the setting screen; and
registering the document to be printed and identification information of the document in a document assurance system in a case in which trust printing is selected on the setting screen,
wherein the obtained information contains information indicating whether the selected image formation apparatus is capable of the trust printing, and, in the providing the setting screen, if the selected image formation apparatus is incapable of the trust printing, the setting screen is displayed such that a setting item for the trust printing cannot be selected, and
wherein the process comprises, in the trust printing, causing the image formation apparatus to print the document to be printed by synthesizing the document and the identification information.

9. A printing control method of an information processing system for supporting trust printing that prints a document to be printed by registering the document in a document assurance system that assures authenticity of the document, the printing control method comprising:
obtaining information of usable image formation apparatuses, and providing a setting screen of an image formation apparatus selected from the usable image formation apparatuses based on the obtained information;
causing the selected image formation apparatus to print the document to be printed in accordance with a setting on the setting screen; and
registering the document to be printed and identification information of the document in the document assurance system in a case in which the trust printing is selected on the setting screen,
wherein the obtained information contains information indicating whether the selected image formation apparatus is capable of trust printing, and, if the selected image formation apparatus is incapable of the trust printing, the setting screen is displayed such that a setting item for the trust printing cannot be selected, and
wherein the printing control method comprises, in the trust printing, causing the image formation apparatus to print the document to be printed by synthesizing the document and the identification information.

* * * * *